(12) United States Patent
Sagasaki et al.

(10) Patent No.: US 11,131,979 B2
(45) Date of Patent: Sep. 28, 2021

(54) NUMERICAL CONTROL DEVICE AND NUMERICAL CONTROL METHOD

(71) Applicant: Mitsubishi Electric Corporation, Tokyo (JP)

(72) Inventors: Masakazu Sagasaki, Tokyo (JP); Satoru Inokuchi, Tokyo (JP); Yoshinori Yamada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/276,486

(22) PCT Filed: Nov. 29, 2018

(86) PCT No.: PCT/JP2018/043942
§ 371 (c)(1),
(2) Date: Mar. 16, 2021

(87) PCT Pub. No.: WO2020/110251
PCT Pub. Date: Jun. 4, 2020

(65) Prior Publication Data
US 2021/0247734 A1    Aug. 12, 2021

(51) Int. Cl.
*G05B 19/18* (2006.01)
*G05B 13/02* (2006.01)

(52) U.S. Cl.
CPC ....... *G05B 19/182* (2013.01); *G05B 13/0265* (2013.01); *G05B 2219/37346* (2013.01); *G05B 2219/37435* (2013.01)

(58) Field of Classification Search
None
See application file for complete search history.

(56) References Cited

U.S. PATENT DOCUMENTS 9,791,846 B2    10/2017  Watanabe et al.
2007/0052326 A1*  3/2007  Liu .................. B23B 29/125
                                                    310/323.18
(Continued)

FOREIGN PATENT DOCUMENTS

EP    3225355 A1 * 10/2017 ............... B23Q 5/50
JP    7-152417 A    6/1995
(Continued)

OTHER PUBLICATIONS

International Search Report and Written Opinion dated Jan. 29, 2019, received for PCT Application PCT/JP2018/043942 Filed on Nov. 29, 2018, 10 pages including English Translation.

(Continued)

*Primary Examiner* — Jennifer L Norton
(74) *Attorney, Agent, or Firm* — Xsensus LLP

(57) ABSTRACT

A numerical control device for controlling a main shaft, which is a rotating shaft for a workpiece, a drive shaft that drives a tool for vibration cutting of the workpiece in an X-axis direction, and a drive shaft that drives the tool or the workpiece in a Z-axis direction, includes: a storage unit that stores a machining program for vibration cutting of the workpiece; and a control computation unit that calculates a specific point that the tool passes during vibration cutting on the basis of a tolerance value, which is an allowable error in machining of a corner of the workpiece, and generates a vibration waveform of the tool indicating a movement path of the tool passing the specific point, in which the control computation unit controls movement and vibration of the tool in accordance with the machining program and the vibration waveform.

14 Claims, 17 Drawing Sheets

(56) References Cited

U.S. PATENT DOCUMENTS

| | | | |
|---|---|---|---|
| 2009/0240367 A1* | 9/2009 | Takahashi | B23Q 1/34 |
| | | | 700/160 |
| 2014/0102268 A1* | 4/2014 | Hariki | B23B 29/125 |
| | | | 82/118 |
| 2017/0075337 A1 | 3/2017 | Kameta et al. | |
| 2017/0300029 A1 | 10/2017 | Oda et al. | |
| 2018/0067466 A1 | 3/2018 | Sonoda | |
| 2018/0335765 A1* | 11/2018 | Tezuka | G05B 19/404 |
| 2020/0406416 A1* | 12/2020 | Morihashi | B23Q 15/013 |

FOREIGN PATENT DOCUMENTS

| | | |
|---|---|---|
| JP | 5599523 B1 | 10/2014 |
| JP | 2017-56515 A | 3/2017 |
| JP | 2018-41275 A | 3/2018 |
| WO | 2015/140906 A1 | 9/2015 |
| WO | 2016/067392 A1 | 5/2016 |

OTHER PUBLICATIONS

Notification of Reasons for Refusal dated Oct. 2, 2019, received for JP Application 2019-537850, 8 pages including English Translation.
Decision of Refusal dated Feb. 18, 2020, received for JP Application 2019-537850, 6 pages including English Translation.

* cited by examiner

NUMERICAL CONTROL DEVICE AND NUMERICAL CONTROL METHOD

CROSS-REFERENCE TO RELATED APPLICATION

The present application is based on PCT filing PCT/JP2018/043942, filed Nov. 29, 2018, the entire contents of which are incorporated herein by reference.

FIELD

The present invention relates to a numerical control device that controls vibration cutting performed with vibration of a tool and to a numerical control method.

BACKGROUND

In the field of turning, a numerical control device controls the operation of a tool in accordance with a machining program for machining an object to be machined to make the tool machine the object. Some numerical control devices cause a tool to perform vibration cutting on an object to be machined while vibrating the tool at a specific frequency along a movement path of the tool.

A numerical control device described in Patent Literature 1 calculates a command movement amount per unit time from movement commands for a tool, calculates a vibration movement amount per unit time from a vibration condition, combines the command movement amount and the vibration movement amount to calculate a combined movement amount, and controls vibration cutting on the basis of the combined movement amount. For machining a corner portion of an object to be machined in the X-axis direction and the Z-axis direction, the numerical control device described in Patent Literature 1 smoothly machines the corner portion by executing a command in the Z-axis direction at a point when a vibration forward position of the tool reaches a target position in the X-axis position of the tool instead of waiting for a next command until the tool reaches the target position.

CITATION LIST

Patent Literature

Patent Literature 1: Japanese Patent No. 5599523

SUMMARY

Technical Problem

The technology of Patent Literature 1 enables machining of a corner in a specific shape, but does not enable machining of a corner with desired machining accuracy.

The present invention has been made in view of the above, and an object thereof is to provide a numerical control device capable of performing machining of a corner with desired machining accuracy.

Solution to Problem

To solve the aforementioned problems and achieve the object, the present invention provides a numerical control device for controlling a main shaft, a first drive shaft, and a second drive shaft, the main shaft being a rotating shaft for an object to be machined, the first drive shaft driving a tool for vibration cutting of the object in a first direction, the second drive shaft driving the tool or the object in a second direction, including a storage unit that stores a machining program for vibration cutting of the object. The numerical control device of the present invention includes a control computation unit that calculates a specific point that the tool passes during the vibration cutting on the basis of a tolerance value being an allowable error in machining of a corner of the object, and generates a vibration waveform of the tool indicating a movement path of the tool passing the specific point. The control computation unit controls movement and vibration of the tool in accordance with the machining program and the vibration waveform.

Advantageous Effects of Invention

A numerical control device according to the present invention produces an effect of enabling machining of a corner with desired machining accuracy.

DESCRIPTION OF EMBODIMENTS

A numerical control device and a numerical control method according to certain embodiments of the present invention will be described in detail below with reference to the drawings. Note that the present invention is not limited to the embodiments.

First Embodiment

Figure 1:
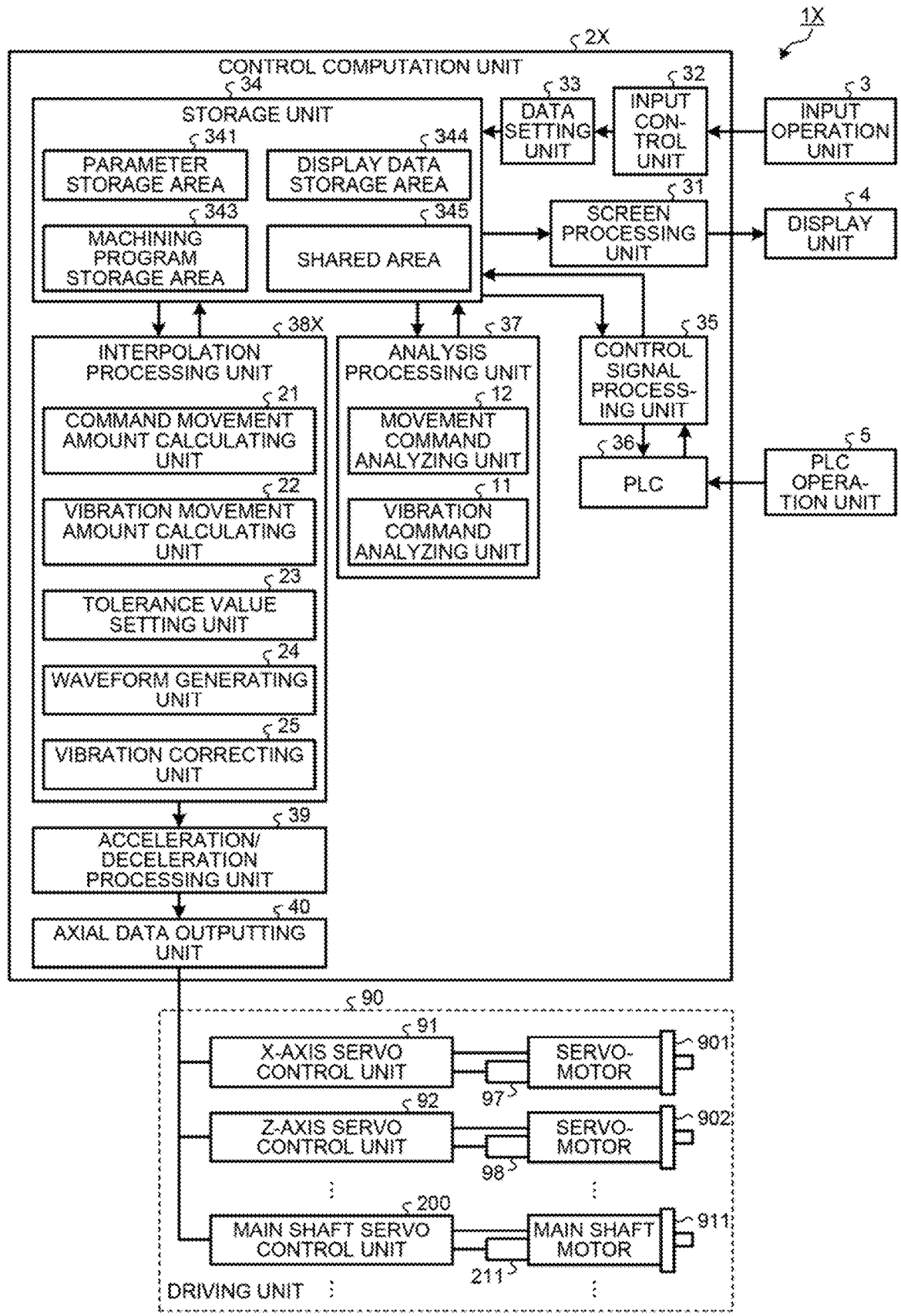
FIG. 1 is a diagram illustrating an example of a configuration of a numerical control device according to a first embodiment.
Figure 2:
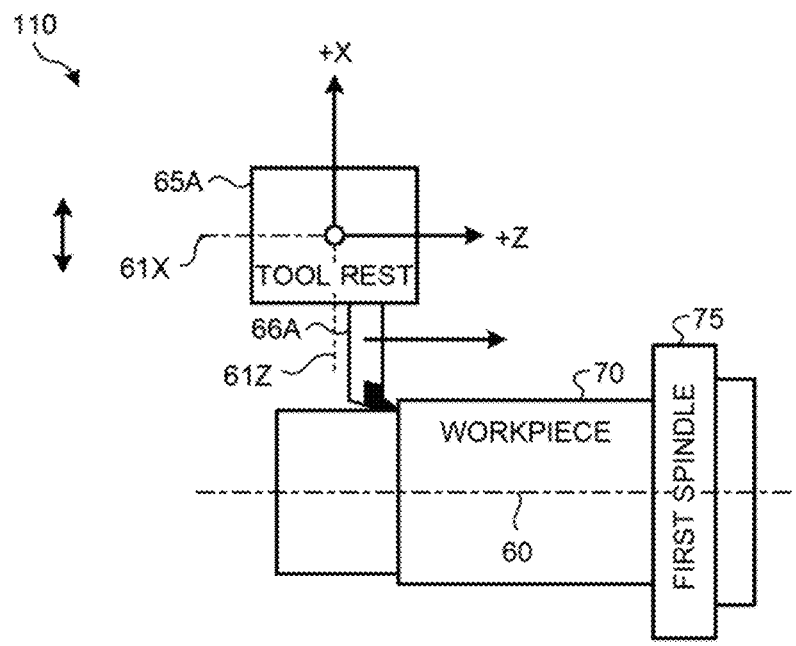
FIG. 2 is a diagram illustrating an example of a configuration of a machine tool according to the first embodiment.

FIG. 1 is a diagram illustrating an example of a configuration of a numerical control device according to a first embodiment. FIG. 2 is a diagram illustrating an example of a configuration of a machine tool according to the first embodiment. In FIG. 2, the horizontal direction of the drawing corresponds to a Z-axis direction, and the vertical direction thereof corresponds to an X-axis direction.

A numerical control (NC) device 1X is a computer that performs control of low frequency vibration-cutting (LFV), which is machining with vibration of a tool 66A, on a machine tool 110 for a turning process. In the description below, low frequency vibration will also be simply referred to as vibration.

The numerical control device 1X generates a movement path such that the tool 66A passes a specific point (a specific waypoint, which will be described later) associated with a tolerance value, which is an allowable error in machining of a corner of a workpiece 70, on the basis of the tolerance value.

The numerical control device 1X controls machining of the workpiece 70 while moving the tool 66A and the workpiece 70, which is an object to be machined, relative to each other by two or more drive shafts. Specifically, the numerical control device 1X causes the machine tool 110, which includes a drive shaft in the Z-axis direction for moving the tool 66A or the workpiece 70 and a drive shaft in the X-axis direction for moving the tool 66A, to perform vibration cutting on the workpiece 70 with the tool 66A.

In the first embodiment, a case in which the numerical control device 1X controls a machine tool 110 including one main shaft 60, which is a rotating shaft for the workpiece 70, and two drive shafts for moving the tool 66A will be described. The workpiece 70 is an object to be machined by the machine tool 110. Note that, in FIG. 2, a central line of the main shaft 60 is illustrated as the main shaft 60.

The numerical control device 1X includes a control computation unit 2X, an input operation unit 3, a display unit 4, and a programmable logic controller (PLC) operation unit 5 such as a machine control panel for operating a PLC 36. In FIG. 1, a driving unit 90, which is a component of the machine tool 110 is illustrated.

The driving unit 90 drives a tool rest 65A of the machine tool 110, and the like. The driving unit 90 is a driving mechanism that drives the tool 66A while rotating the workpiece 70. In the first embodiment, the tool 66A is driven in two directions, which are a direction parallel to the X-axis direction and a direction parallel to the Z-axis direction. The driving unit 90 moves and vibrates the tool 66A along the X-axis direction and the Z-axis direction. Specifically, the driving unit 90 controls driving in the X-axis direction and the Z-axis direction, so that the tool rest 65A moves in an X-Z plane. Note that the axial directions depend on the device configuration, and are therefore not limited to the aforementioned directions. A right arrow in FIG. 2 indicates a machining direction in which the tool 66A machines the workpiece 70 in the first embodiment.

The driving unit 90 includes servomotors 901 and 902 for moving the tool 66A in respective axial directions defined in the numerical control device 1X, and detectors 97 and 98 for detecting positions and velocities of the servomotors 901 and 902. The driving unit 90 also includes servo control units of the respective axial directions for controlling the servomotors 901 and 902 on the basis of commands from the numerical control device 1X. The servo control units of the respective axial directions perform feedback control on the servomotors 901 and 902 on the basis of the positions and the velocities from the detectors 97 and 98.

Among the servo control units, an X-axis servo control unit 91 controls the operation of the tool 66A in the X-axis direction by controlling the servomotor 901, and a Z-axis servo control unit 92 controls the operation of the tool 66A in the Z-axis direction by controlling the servomotor 902. Note that the machine tool 110 may include two or more tool rests. In this case, the driving unit 90 includes, for each tool rest, a set of the X-axis servo control unit 91, the Z-axis servo control unit 92, the servomotors 901 and 902, and the detectors 97 and 98.

The driving unit 90 also includes a main shaft motor 911 for rotating the main shaft 60 for rotating the workpiece 70, and a detector 211 for detecting the position and the rotation speed of the main shaft motor 911. The rotation speed detected by the detector 211 corresponds to the rotation speed of the main shaft motor 911.

The driving unit 90 also includes a main shaft servo control unit 200 for controlling the main shaft motor 911 on the basis of commands from the numerical control device 1X. The main shaft servo control unit 200 performs feedback control on the main shaft motor 911 on the basis of the position and the velocity from the detector 211.

Note that, in a case where the machine tool 110 machines two workpieces 70 at the same time, the driving unit 90 includes two sets of the main shaft motor 911, the detector 211, and the main shaft servo control unit 200. In this case, the machine tool 110 includes two or more tool rests.

The input operation unit 3 is means for inputting information to the control computation unit 2X. The input operation unit 3 is constituted by input means such as a keyboard, a button, or a mouse, to receive an input of a command or the like to the numerical control device 1X from a user, a machining program, a parameter, or the like, and inputs the received command, machining program, parameter, or the like to the control computation unit 2X. The display unit 4 is constituted by display means such as a liquid crystal display device, to display information processed by the control computation unit 2X on a display screen. The PLC operation unit 5 receives an operation made by the user, and sends an instruction corresponding to the operation to the PLC 36.

The control computation unit 2X, which is a control unit, includes an input control unit 32, a data setting unit 33, a storage unit 34, a screen processing unit 31, an analysis processing unit 37, a control signal processing unit 35, the PLC 36, an interpolation processing unit 38X, an acceleration/deceleration processing unit 39, and an axial data outputting unit 40. Note that the PLC 36 may be located outside of the control computation unit 2X.

The storage unit 34 includes a parameter storage area 341, a machining program storage area 343, a display data storage area 344, and a shared area 345. The parameter storage area 341 stores parameters to be used for processing performed by the control computation unit 2X, and the like. Specifically, the parameter storage area 341 stores control parameters, servo parameters, and tool data for making the numerical control device 1X operate. The machining program storage area 343 stores machining programs (such as a machining program 101, which will be described later) to be used for machining of a workpiece 70. A machining program in the first embodiment includes vibration commands, which are commands to vibrate the tool 66A, and movement commands, which are commands to move the tool 66A.

The display data storage area 344 stores screen display data to be displayed by the display unit 4. The screen display data are data for displaying information on the display unit 4. The storage unit 34 also includes the shared area 345 for storing data to be temporarily used.

The screen processing unit 31 performs control to display the screen display data stored in the display data storage area 344 on the display unit 4. The input control unit 32 receives information input from the input operation unit 3. The data setting unit 33 stores information received by the input control unit 32 into the storage unit 34. Thus, input information received by the input operation unit 3 is written into the storage unit 34 via the input control unit 32 and the data setting unit 33.

The control signal processing unit 35 is connected with the PLC 36, and receives signal information of a relay or the like for making the machine tool 110 to operate from the PLC 36. The control signal processing unit 35 writes received signal information into the shared area 345 of the storage unit 34. The signal information is referred to by the interpolation processing unit 38X during machining operation. In addition, when an auxiliary command is output by the analysis processing unit 37 into the shared area 345, the control signal processing unit 35 reads out the auxiliary command from the shared area 345 and transmits the read auxiliary command to the PLC 36. Auxiliary commands are commands other than commands to move a drive shaft, which is a numerically-controlled shaft. Examples of the auxiliary commands include M codes and T codes.

When the PLC operation unit 5 is manipulated, the PLC 36 performs an operation associated with the manipulation. The PLC 36 stores ladder programs describing machine operations to be performed by the PLC 36. Upon receiving a T code or an M code, which is an auxiliary command, the PLC 36 performs a process associated with the auxiliary command on the machine tool 110 in accordance with the ladder program. After performing the process associated with the auxiliary command, the PLC 36 transmits a completion signal indicating that the machine control is completed to the control signal processing unit 35 so as to execute a next block of the machining program.

In the control computation unit 2X, the control signal processing unit 35, the analysis processing unit 37, and the interpolation processing unit 38X are connected with each other via the storage unit 34, to write and read information via the storage unit 34. In the description below, the storage unit 34 may be omitted from explanation of writing and reading of information into and out of the control signal processing unit 35, the analysis processing unit 37, and the interpolation processing unit 38X.

A machining program is selected by a user inputting a machining program number with the input operation unit 3. The machining program number is written into the shared area 345 via the input control unit 32 and the data setting unit 33. Being triggered by a cycle start of a machine control panel or the like, upon receiving workpiece specifying information specifying a workpiece 70 associated with the selected machining program number in the shared area 345 from the shared area 345, the analysis processing unit 37 reads the machining program associated with the workpiece specifying information from the machining program storage area 343, and performs an analysis process on each block (each line) of the machining program. The analysis processing unit 37 analyzes G codes (commands relating to shaft movements), T codes (tool replacement commands, etc.), S codes (main shaft motor speed commands), and M codes (machine operation commands), for example.

When an M code or a T code is included in the analyzed line, the analysis processing unit 37 sends the analysis result to the PLC 36 via the shared area 345 and the control signal processing unit 35. When an M code is included in the analyzed line, the analysis processing unit 37 sends the M code to the PLC 36 via the control signal processing unit 35. The PLC 36 executes machine control associated with the M code. When the execution is completed, a result indicating completion of the M code is written into the storage unit 34 via the control signal processing unit 35. The interpolation processing unit 38X refers to the execution result written in the storage unit 34.

When a G code is included, the analysis processing unit 37 sends the analysis result to the interpolation processing unit 38X via the shared area 345. Specifically, the analysis processing unit 37 generates a movement condition associated with the G code, and sends the movement condition to the interpolation processing unit 38X. In addition, the analysis processing unit 37 sends a main shaft speed specified by an S code to the interpolation processing unit 38X. The main shaft speed is the number of rotations of the main shaft 60 per unit time. The movement condition is a tool feed condition for the tool 66A to move its machining position, and is expressed by the velocities at which the tool rest 65A is to be moved, the positions to which tool rest 65A is to be moved, and the like. For example, for tool feed of the tool 66A, the tool 66A is advanced in the X-axis direction (+X direction) and the Z-axis direction (+Z direction).

In addition, the analysis processing unit 37 includes a vibration command analyzing unit 11, and a movement command analyzing unit 12. The vibration command analyzing unit 11 is means for analyzing vibration commands in the X-axis direction and the Z-axis direction. The vibration command analyzing unit 11 analyzes vibration commands included in a machining program (such as the machining program 101, which will be described later), generates a vibration condition in the X-axis direction and the Z-axis direction, and sends the generated vibration condition to the interpolation processing unit 38X via the shared area 345.

The vibration condition is a condition on vibration in performing vibration cutting. An example of the vibration condition is the number of vibrations in vibration cutting. The number of vibrations in the X-axis direction refers to the number of vibrations of the tool rest 65A in the X-axis direction while the main shaft 60 makes one revolution, and the number of vibrations in the Z-axis direction refers to the number of vibrations of the tool rest 65A in the Z-axis direction while the main shaft 60 makes one revolution. The number of vibrations of the tool rest 65A corresponds to the frequency of vibration based on the time taken by the main shaft 60 to make one revolution.

The movement command analyzing unit 12 analyzes movement commands included in a machining program, generates a movement condition in the X-axis direction and the Z-axis direction, and sends the generated movement condition to the interpolation processing unit 38X via the shared area 345. In a machining program, the main shaft speed, the vibration commands, and the movement commands are set such that swarf can be finely chipped. The movement command analyzing unit 12 generates a movement condition associated with the G code, and sends the movement condition to the interpolation processing unit 38X. Examples of the movement condition include the moving velocity of the tool rest 65A, a position to which the tool rest 65A is to be moved, and the like.

A vibration command in the X-axis direction is a command to vibrate the tool rest 65A in the X-axis direction, and a vibration command in the Z-axis direction is a command to vibrate the tool rest 65A in the Z-axis direction. A movement command in the X-axis direction is a command to move the tool rest 65A in the X-axis direction, and a movement command in the Z-axis direction is a command to move the tool rest 65A in the Z-axis direction.

The interpolation processing unit 38X includes a command movement amount calculating unit 21, a vibration movement amount calculating unit 22, a tolerance value setting unit 23, a waveform generating unit 24, and a vibration correcting unit 25. The interpolation processing unit 38X reads out the main shaft speed, and the numbers of vibrations of the tool rest 65A in the X-axis direction and the Z-axis direction from the shared area 345.

The command movement amount calculating unit 21 receives the movement condition, which is the analysis result, from the analysis processing unit 37, performs an interpolation process on the movement condition, and calculates a command movement amount per unit time associated with the result of the interpolation process. Specifically, the command movement amount calculating unit 21 calculates a command movement amount by which the tool rest 65A is to be moved in the X-axis direction per unit time on the basis of the movement condition in the X-axis direction analyzed by the analysis processing unit 37, and sends the command movement amount to the waveform generating unit 24. The command movement amount calculating unit 21 also calculates a command movement amount by which the tool rest 65A is to be moved in the Z-axis direction per unit time on the basis of the movement condition in the Z-axis direction analyzed by the analysis processing unit 37, and sends the command movement amount to the waveform generating unit 24.

The tolerance value setting unit 23 sets a tolerance value in machining of a corner. Specifically, the tolerance value setting unit 23 checks whether or not a tolerance value is specified by a machining program, a ladder program, or a parameter, and sets a tolerance value on the basis of priority information defining which of the tolerance values specified by the machining program, the ladder program, and the parameter is given priority. The tolerance value setting unit 23 sends the set tolerance value to the waveform generating unit 24. The priority information is stored in the storage unit 34.

In the first embodiment, cutting directions include the X-axis direction and the Z-axis direction in FIG. 2. The movement of the tool 66A is movement for vibration cutting plus movement in the direction (cutting direction) in which machining of the workpiece 70 is advanced. Thus, the waveform generating unit 24 adds together the vibration movement amount for vibration cutting and the movement amount in the cutting direction for advancing machining of the workpiece 70. The vibration movement amount is expressed by a waveform, for example.

Specifically, the waveform generating unit 24 generates a combined movement amount in the X-axis direction by combining the command movement amount in the X-axis direction sent from the command movement amount calculating unit 21 and the vibration movement amount in the X-axis direction sent from the vibration movement amount calculating unit 22. The waveform generating unit 24 also generates a combined movement amount in the Z-axis direction by combining the command movement amount in the Z-axis direction sent from the command movement amount calculating unit 21 and the vibration movement amount in the Z-axis direction sent from the vibration movement amount calculating unit 22.

The combined movement amount in the X-axis direction is expressed by a waveform on a graph with the horizontal axis representing time and the vertical axis representing the position in the X-axis direction, and the combined movement amount in the Z-axis direction is expressed by a waveform on a graph with the horizontal axis representing time and the vertical axis representing the position in the Z-axis direction. The waveform generating unit 24 sends a waveform of a movement path indicating the combined movement amounts in the X-axis direction and the Z-axis direction, which are results of the interpolation process, to the vibration correcting unit 25. Hereinafter, the waveform expressing the movement path of the tool 66A during vibration cutting will be referred to as a vibration waveform.

The vibration correcting unit 25 corrects the vibration waveform in the X-axis direction at the end of the vibration waveform in the X-axis direction on the basis of the vibration waveform in the X-axis direction and a target position (X coordinate) of machining. The vibration correcting unit 25 corrects the vibration waveform in the Z-axis direction at the start and at the end of the vibration waveform in the Z-axis direction on the basis of the vibration waveform in the Z-axis direction and a target position (Z coordinate) of machining.

The vibration correcting unit 25 also calculates the coordinates that the movement path is to pass on the basis of the tolerance value, and adjusts the timing at which the movement in the Z-axis direction is to be started so that the movement path passes the calculated coordinates. In this process, the vibration correcting unit 25 adjusts the timing at which the vibration waveform (movement and vibration) in the Z-axis direction is to be started on the basis of the calculated coordinates, the vibration waveform in the X-axis direction, and the vibration waveform in the Z-axis direction. The vibration correcting unit 25 sends the corrected vibration waveform in the X-axis direction and the corrected vibration waveform in the Z-axis direction to the acceleration/deceleration processing unit 39.

The acceleration/deceleration processing unit 39 performs an acceleration/deceleration process for smoothly changing the acceleration on the result of the interpolation process supplied from the interpolation processing unit 38X. The acceleration/deceleration processing unit 39 performs the acceleration/deceleration process at the start and at the end of movement. Specifically, the acceleration/deceleration processing unit 39 generates a movement command in the X-axis direction on the basis of the combined movement amount in the X-axis direction, and a movement command in the Z-axis direction on the basis of the combined movement amount in the Z-axis direction. Position commands processed by the acceleration/deceleration processing unit 39 are commands on velocity per unit time.

The acceleration/deceleration processing unit 39 sends a velocity command, which is a processing result of the acceleration/deceleration process, to the axial data outputting unit 40. Note that the acceleration/deceleration processing unit 39 does not perform the acceleration/deceleration process on the main shaft speed. The acceleration/deceleration processing unit 39 sends a speed command for the main shaft speed to the axial data outputting unit 40. The speed command generated by the acceleration/deceleration processing unit 39 is a step command.

The axial data outputting unit 40 outputs a velocity command to the driving unit 90. Specifically, the axial data outputting unit 40 outputs a velocity command for the X axis to the X-axis servo control unit 91, and a velocity command for the Z axis to the Z-axis servo control unit 92. The axial data outputting unit 40 also outputs a speed command for the main shaft 60 to the main shaft servo control unit 200. Thus, the X-axis servo control unit 91, the Z-axis servo control unit 92, and the main shaft servo control unit 200 control the operations of the tool 66A in the X-axis direction and the Z-axis direction and the rotating operation of the main shaft 60.

An outline of operation procedures for machining control performed by the numerical control device 1X will now be described. When machining by the machine tool 110 is started, the PLC 36 outputs a cycle start signal to the control signal processing unit 35, and the control signal processing unit 35 outputs a cycle start signal to the interpolation processing unit 38X. The interpolation processing unit 38X thus activates the analysis processing unit 37.

Thereafter, the analysis processing unit 37 reads and analyzes a machining program for each block, and stores a vibration condition, a movement condition, and a main shaft speed, which are results of the analysis, into the shared area 345. The interpolation processing unit 38X then calculates a combined movement amount in the X-axis direction per unit time and a combined movement amount in the Z-axis direction per unit time on the basis of the analysis results from the analysis processing unit 37, and sends the combined movement amounts to the acceleration/deceleration processing unit 39.

Thus, the acceleration/deceleration processing unit 39 generates a movement command in the X-axis direction obtained by the acceleration/deceleration process on the basis of the combined movement amount in the X-axis direction, and a movement command in the Z-axis direction obtained by the acceleration/deceleration process on the basis of the combined movement amount in the Z-axis direction. The movement commands are output from the axial data outputting unit 40 to the driving unit 90, and the driving unit 90 controls the operations on the X axis and the Z axis in accordance with the movement commands.

The machine tool 110 according to the first embodiment is a single-spindle, single-turret lathe in which the tool rest 65A includes a drive shaft. A single-spindle, single-turret lathe is a lathe including one main shaft and one tool rest. The tool rest 65A is also called a turret. An example of the machine tool 110 is a turret lathe. Note that, in the machine tool 110, instead of the tool rest 65A moving and vibrating in the Z-axis direction, the workpiece 70 may move and vibrate in the Z-axis direction.

The machine tool 110 incudes a headstock with a first spindle 75. The first spindle 75 rotates with the workpiece 70 mounted thereon, thereby rotating the workpiece 70. The rotating shaft of the workpiece 70 rotated by the first spindle 75 is the main shaft 60 provided on the headstock.

The machine tool 110 includes the tool rest 65A, and the tool rest 65A includes a drive shaft 61X in the X-axis direction and a drive shaft 61Z in the Z-axis direction. The tool rest 65A is movable in the X-axis direction and in the Z-axis direction. In the machine tool 110, the X-axis direction corresponds to a first direction, and the drive shaft 61X in the X-axis direction corresponds to a first drive shaft. In addition, in the machine tool 110, the Z-axis direction corresponds to a second direction, and the drive shaft 61Z in the Z-axis direction corresponds to a second drive shaft. In FIG. 2, a central line of the drive shaft 61X is illustrated as the drive shaft 61X, and a central line of the drive shaft 61Z is illustrated as the drive shaft 61Z. The numerical control device 1X controls the operations of the tool 66A and the workpiece 70 by controlling the main shaft 60, the drive shaft 61X, and the drive shaft 61Z.

The tool rest 65A is a rotary tool rest. A plurality of tools 66A can be mounted on the tool rest 65A, and a tool 66A to be used is switched by turning the tools 66A.

The tool rest 65A vibrates in the X-axis direction and the Z-axis direction, so that the tool 66A performs vibration cutting of the workpiece 70. Specifically, the tool rest 65A vibrates in a direction obtained by adding together the X-axis direction and the Z-axis direction. Thus, the tool rest 65A vibrates in a direction parallel to the machining direction of the tool 66A. Note that, in the description of the first embodiment, for convenience of explanation, vibration of the tool rest 65A may be assumed to be vibration of the tool 66A.

Figure 3:
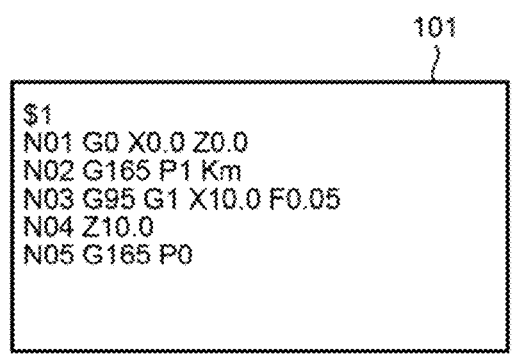
FIG. 3 is a diagram illustrating a machining program to be used by the numerical control device according to the first embodiment.
Figure 4:
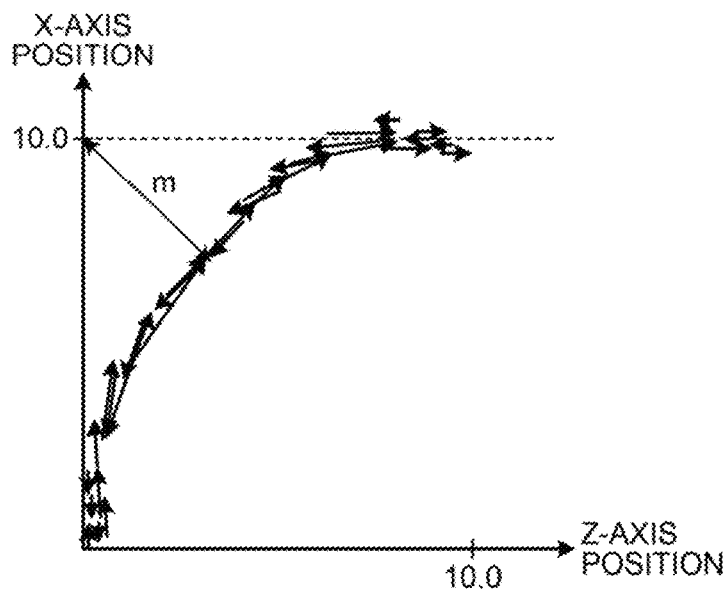
FIG. 4 is a graph illustrating a movement path generated by the numerical control device according to the first embodiment.

FIG. 3 is a diagram illustrating a machining program to be used by the numerical control device according to the first embodiment. FIG. 4 is a graph illustrating a movement path generated by the numerical control device according to the first embodiment. In the first embodiment, the numerical control device 1X generates the movement path in FIG. 4 from the machining program in FIG. 3. The movement path herein includes a movement path in the X-axis direction and a movement path in the Z-axis direction.

The machining program 101 is used by the numerical control device 1X in controlling the machine tool 110. The machining program 101 is an example of the machining program where the tolerance value=m so as to shorten the machining time. In the graph of the movement path illustrated in FIG. 4, the horizontal axis represents a Z-axis position, which is a position in the Z-axis direction, and the vertical axis represents an X-axis position, which is a position in the X-axis direction. The movement path in FIG. 4 has a start position of movement at X=0.0, Z=0.0, and an end position (target position) of movement at X=10.0, Z=10.0.

In a case where the tool 66A is placed on an upper side of the workpiece 70 like the machine tool 110 illustrated in FIG. 2, the tool 66A is on the left of the movement path and the workpiece 70 is on the right thereof in FIG. 4.

In a case where the tool 66A is a drill and performs drilling of the workpiece 70 from right to left along the Z-axis direction, the tool 66A is on the right of the movement path and the workpiece 70 is on the left thereof in FIG. 4. In this case, the Z axis is coincident with the axis of the main shaft 60. In addition, the X-axis direction corresponds to the radial direction of the drilled hole, and the Z-axis direction corresponds to the depth direction of the drilled hole. In the description below, the case where the tool 66A is placed on the upper side of the workpiece 70 like the machine tool 110 illustrated in FIG. 2 will be explained.

The tolerance value is a value indicating an allowable error during machining of a corner of the workpiece 70, and specified by K address. As the tolerance value is larger, the allowable error is larger. As the tolerance value is smaller, the machining accuracy is higher; as the tolerance value is larger, the machining time is shorter. When the tolerance value is 0, the tool 66A passes Z=0.0, X=10.0. Thus, when the tolerance value is 0, the workpiece 70 is machined at a right angle at a position of Z=0.0, X=10.0. In the description, the coordinates Z=0.0, X=10.0 (a corner) when the tolerance value is 0 may be referred to as a right angle position.

When the tolerance value is m, the tool 66A passes a position at a distance m from the right angle position so that the shortest distance between the movement path of the tool 66A and the right angle position is the distance m. In the description below, the position at Z=0.0, X=0.0 may be referred to as a start point, and the position at Z=10.0, X=10.0 may be referred to as an end point. In addition, the coordinates at which the shortest distance between the movement path of the tool 66A and the right angle position is the distance m may be referred to as a specific waypoint.

G0 on N01, which is a first block, is a positioning command, G165 on N02, which is a second block, is a low frequency vibration command, and G95 on N03, which is a third block, is a feed per revolution (synchronous feed) command.

The positioning command is a command to move to a specific position. According to the positioning command in this case, the X coordinate is 0.0 and the Z coordinate is 0.0. The low frequency vibration command is a command to perform low frequency vibration. The low frequency vibration command specifies the tolerance value. The tolerance value in this case is m. The feed per revolution command is a command that specifies a feed rate F per revolution of the main shaft 60.

G0, G165, and G95 are commands (modal commands) that are valid until a specific G code is executed. When feed per revolution, which is G95, is specified, the tool 66A is fed at the feed rate F per revolution of the main shaft 60 from the block of this command. The feed rate F in this case is 0.05.

In addition, the feed per revolution command in this case specifies the X coordinate (X=10.0) to which the tool 66A is to be moved. Thus, the tool 66A is fed at the feed rate F to the specified X coordinate. In addition, on N04, which is a fourth, the Z coordinate (Z=10.0) to which the tool 66A is to be moved is specified. Thus, the tool 66A is fed at the feed rate F to the specified Z coordinate.

In the first embodiment, in the middle of the movement of the tool 66A to the specified X coordinate (X=10.0), the movement of the tool 66A to the specified Z coordinate (Z=10.0) is started. Specifically, the numerical control device 1X adjusts the timing at which the tool 66A starts moving in the Z-axis direction so that the tool 66A moves in the X-axis direction from the point of origin, which is the start point, to a first specific position, moves in both of the X-axis direction and the Z-axis direction from the first specific position to a second specific position, and moves in the Z-axis direction from the second specific position to the end point. In this case, the numerical control device 1X adjusts the timing of starting the movement in the Z-axis direction so that the vibration waveform in the X-axis direction and the vibration waveform in the Z-axis direction pass the specific waypoint at the same time on the movement path from the first specific position to the second specific position. Thus, the numerical control device 1X corrects the start timing of the vibration waveform in the Z-axis direction so that the movement position, which is a combined amount of the movement in the X-axis direction and the movement in the Z-axis direction, passes the specific waypoint. On N05, which is a fifth block, the command of G165 is terminated.

As described above, when the machining program 101 is executed, the tool 66A moves to the X coordinate=0.0, the Z coordinate=0.0. The tool 66A further moves to X=10.0, Z=10.0 while vibrating at the feed rate F=0.05 per revolution of the main shaft 60 in such a manner that the tolerance value=m is satisfied.

In the case where the tool 66A is a drill and performs drilling of the workpiece 70 from right to left along the Z-axis direction, the tool 66A moves to X coordinate=10.0, Z coordinate=10.0. The tool 66A further moves to Z=0.0 while vibrating at the feed rate F=0.05 per revolution of the main shaft 60 in such a manner that the tolerance value=m is satisfied, and moves to X=0.0 while vibrating at the feed rate F=0.05 per revolution of the main shaft 60 in such a manner that the tolerance value=m is satisfied.

Note that the machining program 101 includes a main shaft speed command and the like in addition to the commands illustrated in FIG. 3. The main shaft speed command is a command to rotate the main shaft 60 a specific number of revolutions per minute. In addition, G165 includes the amplitude of the vibration of the tool 66A, the number of vibrations per revolution of the main shaft 60, and the like.

Figure 5:
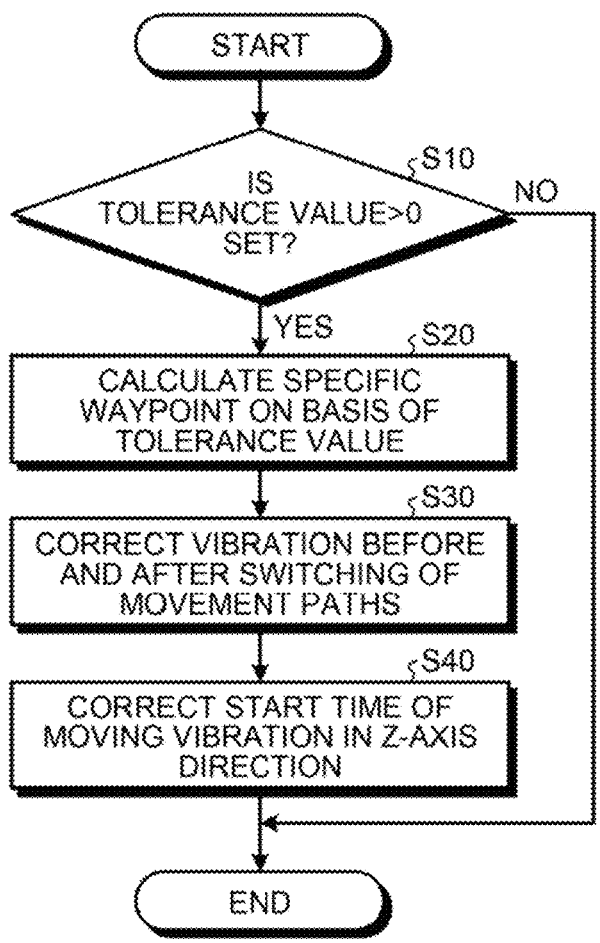
FIG. 5 is a flowchart illustrating procedures of a process of movement path setting performed by the numerical control device according to the first embodiment.

FIG. 5 is a flowchart illustrating procedures of a process of movement path setting performed by the numerical control device according to the first embodiment. In FIG. 5, a movement path setting process in a case where the movement path passes the specific waypoint is explained.

In the analysis processing unit 37 of the numerical control device 1X, the movement command analyzing unit 12 analyzes movement commands included in the machining program 101, generates a movement condition in the X-axis direction and the Z-axis direction, and sends the generated movement condition to the interpolation processing unit 38X via the shared area 345.

In addition, the vibration command analyzing unit 11 analyzes vibration commands included in the machining program 101, generates a vibration condition in the X-axis direction and the Z-axis direction, and sends the generated vibration condition to the interpolation processing unit 38X via the shared area 345. The vibration condition generated by the vibration command analyzing unit 11 includes the frequency and the amplitude of vibration, the tolerance value, and the like.

The tolerance value setting unit 23 determines whether or not a tolerance value larger than 0 is set (whether or not a tolerance value >0 is set) (step S10). The tolerance value is set in a ladder program, a machining program, a parameter, or the like. The tolerance value setting unit 23 sets the tolerance value to be used for tolerance control on the basis of priority information defining which of the tolerance values set in the ladder program, the machining program, the parameter, and the like is given priority, and determines whether or not the set tolerance value is larger than 0.

For example, assume that the order of priority is the ladder program, the machining program, and the parameter in descending order. In this case, when a tolerance value is specified in the ladder program, the tolerance value setting unit 23 sets the tolerance value in the ladder program as the tolerance value to be used for tolerance control. When no tolerance value is specified in the ladder program, the tolerance value setting unit 23 sets a tolerance value in the machining program as the tolerance value to be used for tolerance control. When no tolerance value is specified in the ladder program and the machining program, the tolerance value setting unit 23 sets a tolerance value in the parameter as the tolerance value to be used for tolerance control. Note that the priority information of tolerance values can be switched by an operation performed by the user.

If no tolerance value larger than 0 is set (step S10, No), the numerical control device 1X does not perform the movement path setting process described in the first embodiment.

If a tolerance value larger than 0 is set (step S10, Yes), the tolerance value setting unit 23 calculates the specific waypoint (an X coordinate and a Z coordinate), which is a position that the tool 66A passes, on the basis of the tolerance value (step S20).

Figure 6:
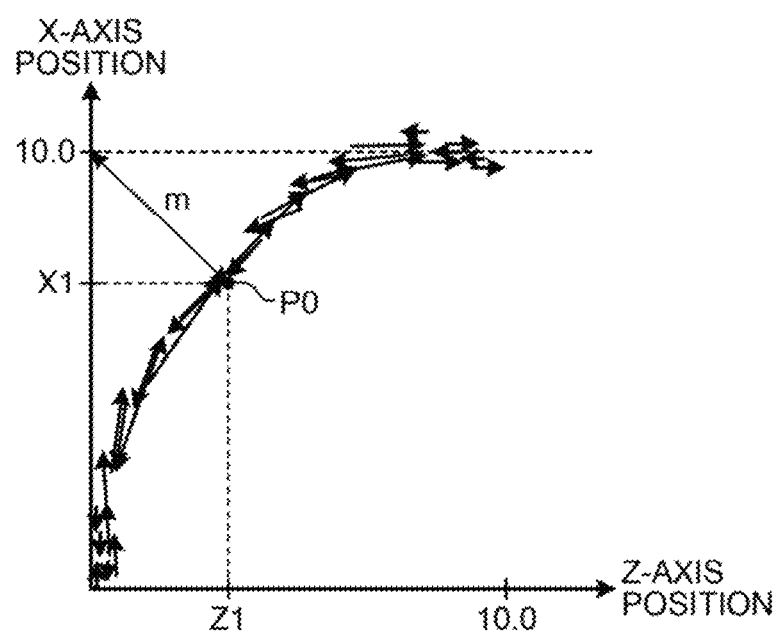
FIG. 6 is a graph for explaining a specific waypoint set by the numerical control device according to the first embodiment.

FIG. 6 is a graph for explaining a specific waypoint set by the numerical control device according to the first embodiment. In FIG. 6, a specific waypoint P0 set to satisfy the tolerance value is illustrated on the movement path illustrated in FIG. 4. The specific waypoint P0 is expressed by the X coordinate=X1, the Z coordinate=Z1. The specific waypoint P0 is a position at a distance m from the position of Z=0.0, X=10.0. The specific waypoint P0 is a position on the movement path of the tool 66A where the distance to the position of Z=0.0, X=10.0 is the shortest.

The waveform generating unit 24 generates a vibration waveform of the movement path indicating a combined movement amount in the X-axis direction by combining the command movement amount in the X-axis direction sent from the command movement amount calculating unit 21 and the vibration movement amount in the X-axis direction sent from the vibration movement amount calculating unit 22.

The waveform generating unit 24 also generates a vibration waveform indicating a combined movement amount in the Z-axis direction by combining the command movement amount in the Z-axis direction sent from the command movement amount calculating unit 21 and the vibration movement amount in the Z-axis direction sent from the vibration movement amount calculating unit 22.

For generating a vibration waveform of a movement path, the waveform generating unit 24 obtains vibration forward positions by adding the amplitude of the vibration condition to the movement path, and vibration backward positions by subtracting the amplitude therefrom. The vibration forward positions are maximum points of the vibration waveform of the movement path, and the vibration backward positions are minimum points of the vibration waveform of the movement path. The waveform generating unit 24 generates the vibration waveforms of the movement path in the X-axis direction and the Z-axis direction on the basis of the vibration forward positions and the vibration backward positions.

The vibration correcting unit 25 corrects vibration waveforms of a first movement path and a second movement path of the movement path on the basis of the vibration waveform indicating the movement path. The first movement path before the correction is a movement path in the X-axis direction with a constant amplitude and the X coordinate from X=0.0 to X=10.0. The second movement path before the correction is a movement path in the Z-axis direction with a constant amplitude and the Z coordinate from Z=0.0 to Z=10.0.

The vibration correcting unit 25 corrects the vibration waveform at the end of the first movement path and the vibration waveform at the start of the second movement path to meet the specified tolerance value=m.

Figure 7:
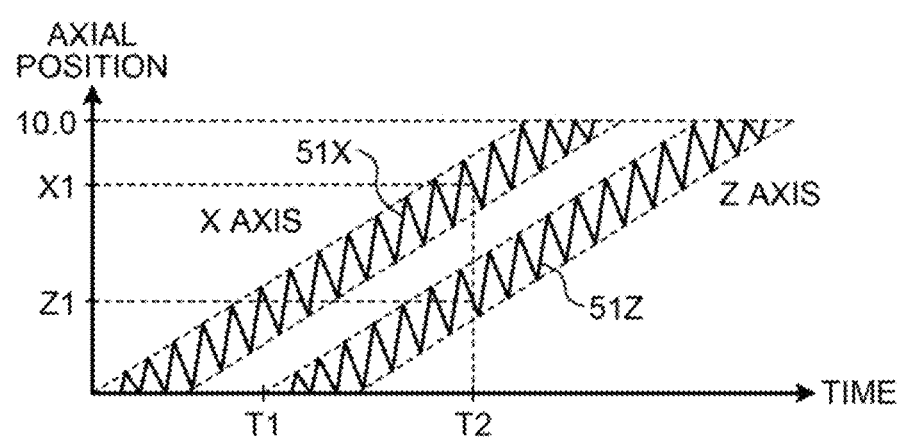
FIG. 7 is a graph for explaining vibration waveforms generated by the numerical control device according to the first embodiment.

FIG. 7 is a graph for explaining vibration waveforms generated by the numerical control device according to the first embodiment. Herein, the vibration waveforms include a vibration waveform in the X-axis direction and a vibration waveform in the Z-axis direction. FIG. 7 illustrates a vibration waveform 51X corresponding to the movement path in the X-axis direction and a vibration waveform 51Z corresponding to the movement path in the Z-axis direction. In FIG. 7, the horizontal axis represents time, the vertical axis of the vibration waveform 51X represents the position (axial position) in the X-axis direction, and the vertical axis of the vibration waveform 51Z represents the position (axial position) in the Z-axis direction. In the first embodiment, the vibration waveform 51X corresponds to a first vibration waveform, and the vibration waveform 51Z corresponds to a second vibration waveform.

The vibration waveforms generated by the waveform generating unit 24 are a vibration waveform (movement path) in the X-axis direction and a vibration waveform (movement path) in the Z-axis direction. The waveform generating unit 24 generates a vibration waveform indicating that machining in the Z-axis direction is to be started at a timing after machining in the X-axis direction is completed. The vibration correcting unit 25 corrects the vibration in the generated vibration waveform before and after switching of the movement paths (step S30). Thus, the vibration correcting unit 25 corrects the vibration waveform at the start of the vibration waveform in the X-axis direction, the vibration waveform at the end of the vibration waveform in the X-axis direction, the vibration waveform at the start of the vibration waveform in the Z-axis direction, and the vibration waveform at the end of the vibration waveform in the Z-axis direction.

Specifically, the vibration correcting unit 25 limits the amplitude of the vibration waveform in the X-axis direction generated by the waveform generating unit 24 so that the position coordinate of the tool 66A at the start of movement in the X-axis direction does not become smaller than X=0.0, and gradually increases the amplitude. Thus, the vibration correcting unit 25 sets the amplitude at the position at the start of movement in the X-axis direction to 0, and gradually increases the amplitude in the X-axis direction. The vibration correcting unit 25 increases the amplitude until the amplitude reaches the amplitude defined in the vibration condition.

In addition, the vibration correcting unit 25 causes the amplitude of the vibration waveform in the X-axis direction generated by the waveform generating unit 24 to converge to 0 so that the position coordinate of the tool 66A at the end of the movement in the X-axis direction does not become larger than X=10.0, to stop the tool 66A. Thus, the vibration correcting unit 25 gradually decreases the amplitude in the X-axis direction so that the vibration does not go beyond a target position when the position indicated by the vibration waveform in the X-axis direction reaches the target position and that the amplitude at the target position where the movement in the X-axis direction is ended becomes 0, to stop the tool 66A. The vibration waveform 51X is obtained as a result of correction of the amplitude at the start and at the end of the vibration waveform in the X-axis direction.

In addition, the vibration correcting unit 25 limits the amplitude of the vibration waveform in the Z-axis direction generated by the waveform generating unit 24 so that the position coordinate of the tool 66A at the start of movement in the Z-axis direction does not become smaller than Z=0.0, and gradually increases the amplitude. Specifically, the vibration correcting unit 25 sets the amplitude at the start position of the movement in the Z-axis direction to 0, and gradually increases the amplitude in the Z-axis direction so that the position indicated by the vibration waveform in the Z-axis direction does not go beyond the start position of the vibration waveform and vibrate in the negative direction of the Z axis. The vibration correcting unit 25 increases the amplitude until the amplitude reaches the amplitude defined in the vibration condition.

In addition, the vibration correcting unit 25 causes the amplitude of the vibration waveform in the Z-axis direction generated by the waveform generating unit 24 to converge to 0 so that the position coordinate of the tool 66A at the end of the movement in the Z-axis direction does not become larger than Z=10.0 in a manner similar to the convergence in the X-axis direction, to stop the tool 66A. The vibration waveform 51Z is obtained as a result of correction of the amplitude at the start and at the end of the vibration waveform in the Z-axis direction.

Subsequently, the vibration correcting unit 25 adjusts the timing (time T1) at which the vibration waveform 51Z is to be started so that the tool 66A passes the specific waypoint P0. In other words, the vibration correcting unit 25 corrects the start time of moving vibration in the Z-axis direction (step S40). The moving vibration refers to the movement of the tool 66A accompanied by vibration. FIG. 7 illustrates the vibration waveform 51Z in which the start time of the moving vibration in the Z-axis direction is brought forward.

The vibration correcting unit 25 adjusts time T1 so that the vibration waveform 51Z passes a position at Z=Z1 at time T2 when the vibration waveform 51X passes a position at X=X1. Thus, the vibration correcting unit 25 adjusts time T1 so that the vibration waveform 51X and the vibration waveform 51Z pass the position at X=X1, Z=Z1, which is a specific waypoint P0, at time T2. In this manner, the vibration correcting unit 25 brings forward the start time of the moving vibration in accordance with the vibration waveform 51Z so that the vibration waveform 51Z reaches Z=Z1 at the point when the vibration waveform 51X reaches X=X1, so as to make the vibration waveform constituted by the vibration waveforms 51X and 51Z pass the specific waypoint P0.

The control computation unit 2X controls the movement and the vibration of the tool 66A in accordance with the machining program 101 and the vibration waveforms 51X and 51Z. Thus, the tool 66A performs the moving vibration in accordance with the vibration waveforms 51X and 51Z illustrated in FIG. 7 to achieve the machining along the movement path illustrated in FIG. 6.

Alternatively, the vibration correcting unit 25 may correct the start time of the moving vibration in accordance with the vibration waveform 51X. For example, the vibration correcting unit 25 corrects the vibration waveform 51X so that an intermediate position between a vibration forward position and a vibration backward position passes the specific waypoint P0. Still alternatively, the vibration correcting unit 25 may correct the start time of the vibration waveform 51Z so that the intermediate position between the vibration forward position and the vibration backward position passes the specific waypoint P0, in addition to the correction of the start time of the moving vibration in accordance with the vibration waveform 51X. Thus, it is sufficient if the machining along the movement path illustrated in FIG. 6 is achieved by relative adjustment of the vibration start time of the vibration waveform 51X and the vibration start time of the vibration waveform 51Z.

In addition, in a case where the vibration waveform 51X passes the specific waypoint P0 a plurality of times, the vibration correcting unit 25 may set any of the passage timings to time T2. In addition, in a case where the vibration waveform 51Z can pass the specific waypoint P0 a plurality of times, the vibration correcting unit 25 may set any of the passage timings to time T2. The vibration correcting unit 25 can also set a timing when time T2 is the shortest, that is, a timing when the specific waypoint P0 is passed the earliest to time T2, and set a timing when time T1 is the shortest to time T1, for example. As a result, the vibration waveform 51X and the vibration waveform 51Z can shorten the time taken by the tool 66A to perform machining. Alternatively, the vibration correcting unit 25 may set the timing when a point nearest to the intermediate position between the vibration forward position and the vibration backward position passes the specific waypoint P0 to time T2 in both of the vibration waveform 51X and the vibration waveform 51Z.

As described above, the numerical control device 1X adjusts time T1, which is the start time of the moving vibration in accordance with the vibration waveform 51Z, on the basis of the tolerance value so that the vibration waveform 51Z passes the specific waypoint P0, which enables vibration cutting associated with the tolerance value to be achieved. Because a larger tolerance value can shorten the machining time and a smaller tolerance value can improve the machining accuracy at a corner portion, the machining time and the machining accuracy in machining of a corner by low frequency vibration cutting can be controlled.

In addition, because the tolerance value can be specified in a machining program, the user can specify the accuracy of machining a corner during low frequency vibration cutting at the user's discretion. In addition, because the tolerance value can be specified in a ladder program, the user can specify the accuracy of machining a corner during low frequency vibration cutting at the user's discretion. In addition, because the tolerance value can be specified by a parameter, the accuracy of machining a corner can be specified by the parameter in advance instead of specifying the tolerance value in a machining program or a ladder program.

As described above, in the first embodiment, when the tolerance value is larger than 0, the numerical control device 1X calculates the specific waypoint P0 associated with the tolerance value, and generates a movement path (X-axis and Z-axis vibration waveforms) that passes the specific waypoint P0. This enables machining of a corner with desired machining accuracy. In addition, this enables machining of a corner in a desired machining time.

Second Embodiment

Next, a second embodiment of the invention will be described with reference to FIGS. 8 to 13. In the second embodiment, a numerical control device 1X sets a movement path in a case where the tolerance value=0 when a specific angle of a machining shape is smaller than a predetermined angle.

Figure 8:
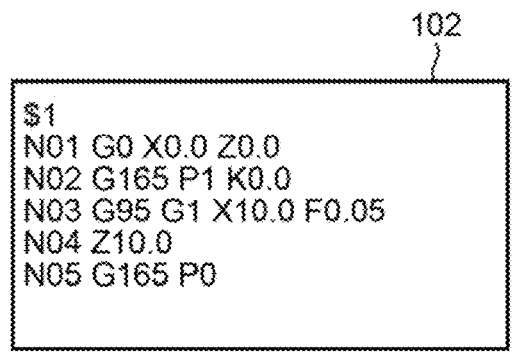
FIG. 8 is a diagram illustrating a machining program to be used by a numerical control device according to a second embodiment.
Figure 9:
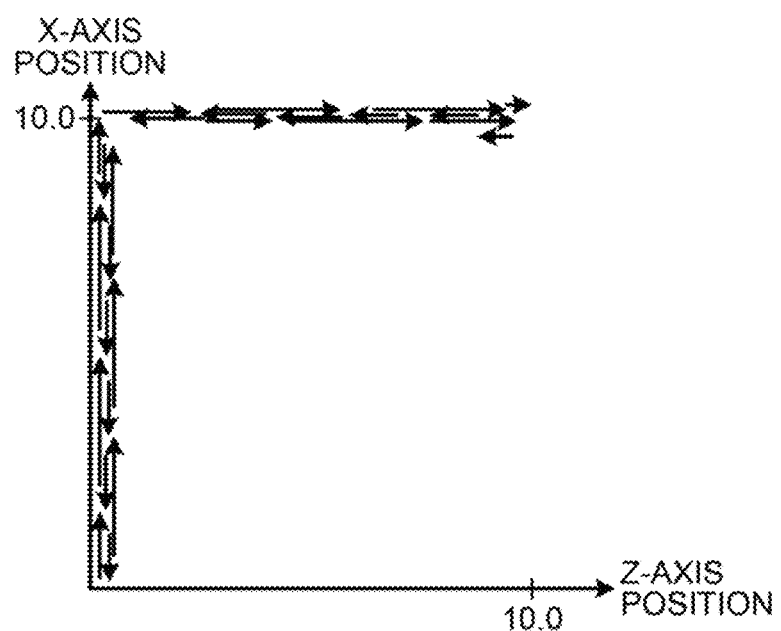
FIG. 9 is a graph illustrating a movement path generated by the numerical control device according to the second embodiment.

FIG. 8 is a diagram illustrating a machining program to be used by the numerical control device according to the second embodiment. FIG. 9 is a graph illustrating a movement path generated by the numerical control device according to the second embodiment. In the second embodiment, the numerical control device 1X generates the movement path in FIG. 9 from the machining program in FIG. 8. The movement path herein includes a movement path in the X-axis direction and a movement path in the Z-axis direction.

A machining program 102 is used by the numerical control device 1X in controlling the machine tool 110. The machining program 102 is an example of the machining program where the tolerance value=0 (in FIG. 8, the tolerance value is described as "0.0") to improve the machining accuracy. In the graph illustrating the movement path in FIG. 9, the horizontal axis represents a position in the Z-axis direction, and the vertical axis represents a position in the X-axis direction.

When the tolerance value is 0, the movement path of the tool 66A passes a right angle position. In other words, with the tolerance value=0, the right angle position is the specific waypoint P0.

In the second embodiment, after moving to a specified X coordinate (X=10.0), the tool 66A starts moving to a specified Z coordinate (Z=10.0). Thus, the numerical control device 1X moves the tool 66A in the X-axis direction from the start point to the right angle position and in the Z-axis direction from the right angle position to the end point.

Note that the machining program 102 includes a main shaft speed command and the like in addition to the commands illustrated in FIG. 8. In addition, G165 in the machining program 102 includes the amplitude of the vibration of the tool 66A, the number of vibrations per revolution of the main shaft 60, and the like, in a manner similar to the machining program 101.

Figure 10:
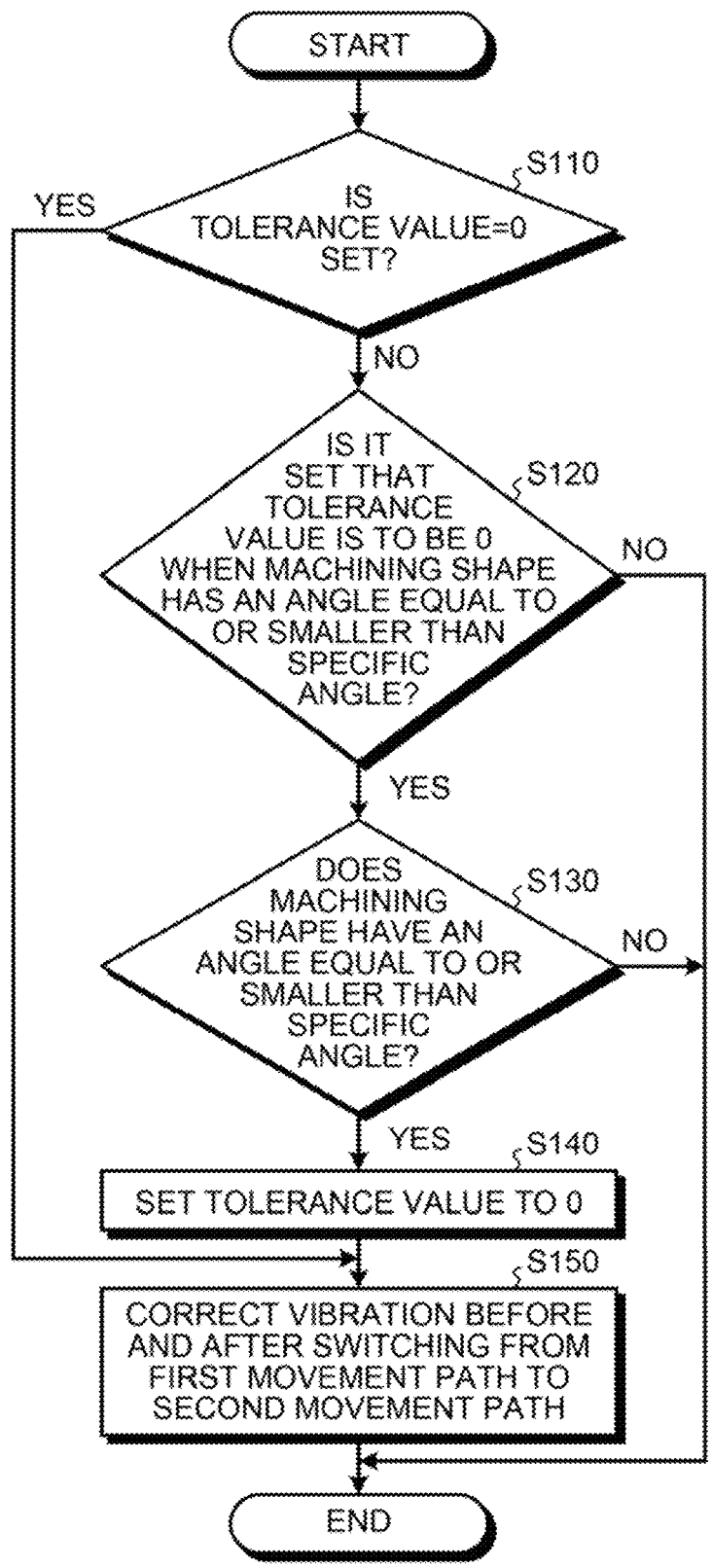
FIG. 10 is a flowchart illustrating procedures of a process of movement path setting performed by the numerical control device according to the second embodiment.

FIG. 10 is a flowchart illustrating procedures of a process of movement path setting performed by the numerical control device according to the second embodiment. In FIG. 10, a movement path setting process in a case where the movement path passes a right angle position is explained. Note that, regarding processing similar to that explained in FIG. 5 of the first embodiment, redundant explanation thereof will not be repeated.

The movement command analyzing unit 12 analyzes movement commands included in the machining program 102, generates a movement condition in the X-axis direction and the Z-axis direction, and sends the generated movement condition to the interpolation processing unit 38X. In addition, the vibration command analyzing unit 11 analyzes vibration commands included in the machining program 102, generates a vibration condition in the X-axis direction and the Z-axis direction, and sends the generated vibration condition to the interpolation processing unit 38X.

The tolerance value setting unit 23 sets the tolerance value to be used for tolerance control on the basis of priority information defining which of the tolerance values set in the machining program, the ladder program, and the like is given priority. The tolerance value setting unit 23 determines whether or not the tolerance value to be used for tolerance control is set to 0 (the tolerance value=0 is set) (step S110).

If the tolerance value is not set to 0 (step S110, No), the tolerance value setting unit 23 determines whether or not it is set that the tolerance value is to be 0 when the machining shape of the workpiece 70 has an angle equal to or smaller than a specific angle (60°, for example) (step S120).

If it is set that the tolerance value is to be 0 when the machining shape is equal to or smaller than the specific angle (step S120, Yes), the tolerance value setting unit 23 determines whether or not the machining shape of the workpiece 70 has an angle equal to or smaller than the specific angle (step S130). While a case where the specific angle 60° will be described herein, the specific angle may be any angle smaller than 90°. When the workpiece 70 is machined at 60°, the movement path of the tool 66A has an angle of 120°, and when the workpiece 70 is machined at 300°, the movement path of the tool 66A has an angle of 60°.

Figure 11:
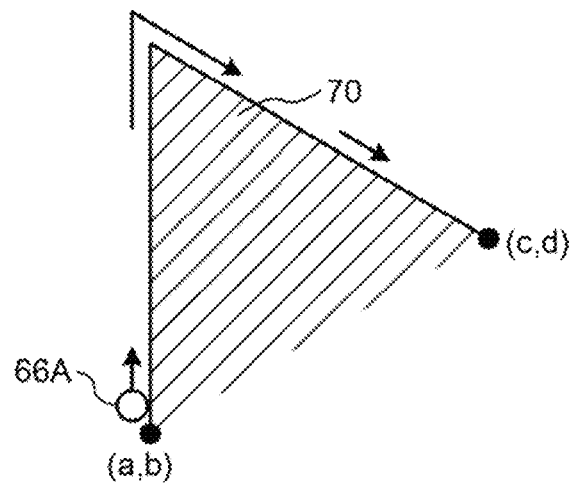
FIG. 11 is a diagram illustrating the shape of a workpiece when a corner of the workpiece has an angle of 60° and a movement path has an angle of 120°.
Figure 12:
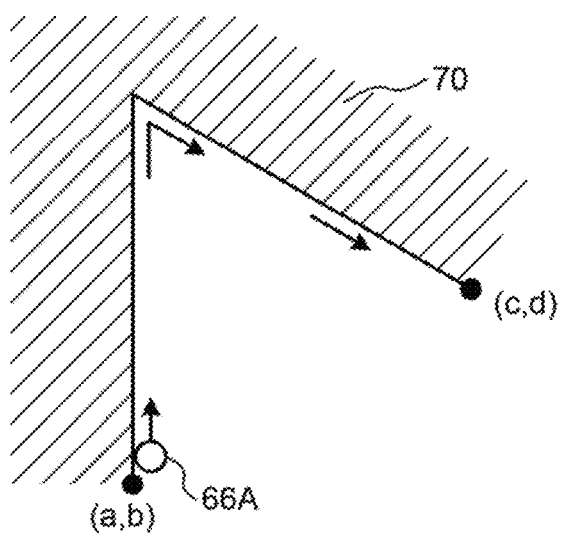
FIG. 12 is a diagram illustrating the shape of a workpiece when a corner of the workpiece has an angle of 300° and a movement path has an angle of 60°.

FIG. 11 is a diagram illustrating the shape of a workpiece when a corner of the workpiece has an angle of 60° and the movement path has an angle of 120°, FIG. 12 is a diagram illustrating the shape of a workpiece when a corner of the workpiece has an angle of 300° and the movement path has an angle of 60°, and both of the workpieces have a specific angle of 60°. Specifically, the specific angle refers to an angle smaller than 180° of the movement path of the tool 66A.

The tolerance value setting unit 23 determines whether or not the workpiece 70 is to be machined at an angle equal to or smaller than a specified specific angle on the basis of a machining program. For example, when a machining program sets a movement path from first coordinates (a, b) to second coordinates (c, d), it cannot be determined whether the movement path has a corner of 60° or a corner of 300° from the information on the coordinates alone. Thus, the tolerance value setting unit 23 determines whether or not the movement path has a corner of 60° or 300° on the basis of a command on a nose R included in the machining program. The nose R includes information on whether the workpiece 70 is to be machined on the right of the tool 66A or on the left of the tool 66A. For example, as illustrated in FIG. 11, when the workpiece 70 is to be machined on the right of the tool 66A, a G code of G42 is used in the machining program. Alternatively, as illustrated in FIG. 12, when the workpiece 70 is to be machined on the left of the tool 66A, a G code of G41 is used in the machining program.

The tolerance value setting unit 23 determines the angle of a corner of the movement path on the basis of the information on the first and second coordinates and the aforementioned G code. Thus, in FIGS. 11 and 12, the workpiece 70 is determined to be machined at 60° when G42 is included in the machining program, or is determined to be machined at 120° when G41 is included in the machining program.

When the machining shape of the workpiece 70 has an angle equal to or smaller than the specific angle (step S130, Yes), the machining accuracy becomes important, and the tolerance value setting unit 23 thus sets the tolerance value to 0 (step S140).

Thus, even when the tolerance value is not set to 0 in a ladder program, etc., parameter setting of automatically setting the tolerance value to 0 when the movement path has an angle equal to or smaller than the specific angle (equal to or smaller than 60°, for example), can be used.

If it is not set that the tolerance value is to be 0 when the machining shape has an angle equal to or smaller than a specific angle (step S120, No), the numerical control device 1X does not perform the movement path setting process described in the second embodiment.

In addition, if the machining shape of workpiece 70 has an angle larger than the specific angle (step S130, No), the numerical control device 1X does not perform the movement path setting process described in the second embodiment.

If the tolerance value=0 is set in a ladder program, etc. (step S110, Yes) or if the tolerance value setting unit 23 sets the tolerance value=0 (step S140), the tolerance value setting unit 23 sends the setting of the tolerance value=0 to the waveform generating unit 24. The waveform generating unit 24 generates a movement path in the X-axis direction and a movement path in the Z-axis direction.

The vibration correcting unit 25 corrects a vibration waveform of a first movement path, which is the movement path in the X-axis direction, and a vibration waveform of a second movement path, which is the movement path in the Z-axis direction, on the basis of the vibration waveform indicating the movement path.

The vibration correcting unit 25 corrects the vibration waveform at the end of the first movement path and the vibration waveform at the start of the second movement path to meet the specified tolerance value=0.

Figure 13:
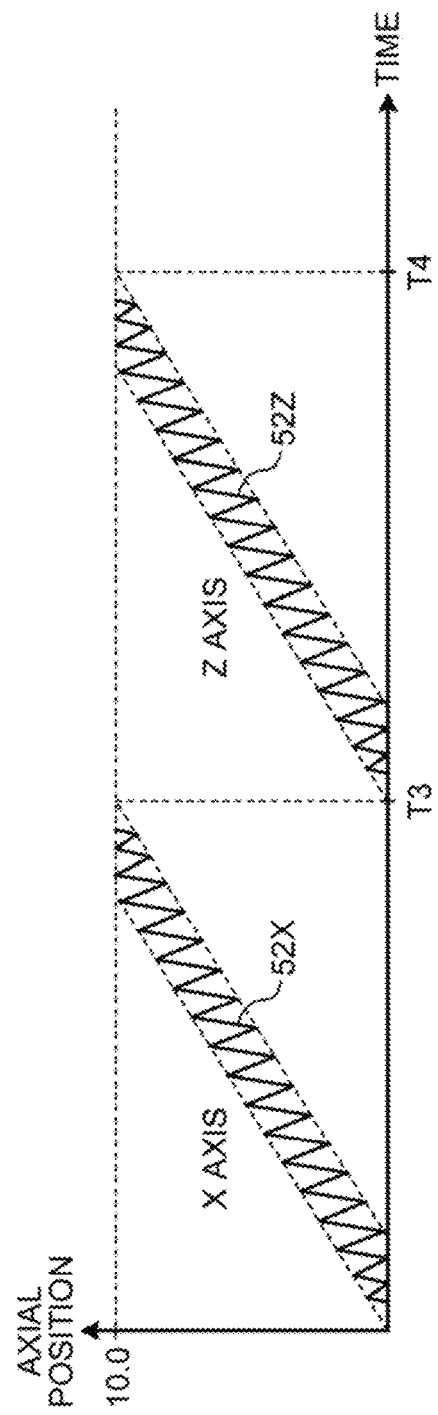
FIG. 13 is a graph for explaining vibration waveforms generated by the numerical control device according to the second embodiment.

FIG. 13 is a graph for explaining vibration waveforms generated by the numerical control device according to the second embodiment. Herein, the vibration waveforms include a vibration waveform in the X-axis direction and a vibration waveform in the Z-axis direction. FIG. 13 illustrates a vibration waveform 52X in the X-axis direction and a vibration waveform 52Z in the Z-axis direction. In FIG. 13, the horizontal axis represents time, the vertical axis of the vibration waveform 52X represents the position (axial position) in the X-axis direction, and the vertical axis of the vibration waveform 52Z represents the position (axial position) in the Z-axis direction. In the second embodiment, the vibration waveform 52X corresponds to the first vibration waveform, and the vibration waveform 52Z corresponds to the second vibration waveform.

The vibration waveforms generated by the waveform generating unit 24 are a vibration waveform in the X-axis direction and a vibration waveform in the Z-axis direction. The waveform generating unit 24 generates a vibration waveform in which machining in the Z-axis direction starts at a timing after machining in the X-axis direction is completed. This enables machining of a corner with a tolerance value 0.

The waveform generating unit 24 generates a vibration waveform in which machining in the Z-axis direction is started at time T3 when a vibration waveform in the X-axis direction reaches a position of X=10.0. The time when a vibration waveform in the Z-axis direction reaches a position of Z=10.0 is time T4. Note that, as illustrated in FIG. 13, the reaching time of a vibration waveform is a time point when a line connecting vibration backward positions of the vibration waveform reaches the end point position.

The vibration correcting unit 25 corrects the vibration before and after switching of the movement paths to meet the specified tolerance value=0. In this process, the vibration correcting unit 25 corrects the vibration before and after switching from the first movement path (the movement path in the X-axis direction) to the second movement path (the movement path in the Z-axis direction) by a process similar to the process described in the first embodiment (step S150).

Specifically, the vibration correcting unit 25 gradually increases the amplitude of the vibration waveform in the X-axis direction generated by the waveform generating unit 24 so that the position coordinate of the tool 66A at the start of vibration in the X-axis direction does not move to a position in the X-axis direction smaller than X=0.0. Thus, the vibration correcting unit 25 sets the amplitude at the position at the start of movement in the X-axis direction to 0, and gradually increases the amplitude in the X-axis direction. The vibration correcting unit 25 increases the amplitude until the amplitude reaches the amplitude defined in the vibration condition.

In addition, the vibration correcting unit 25 causes the amplitude of the vibration waveform in the X-axis direction generated by the waveform generating unit 24 to converge so that the position coordinate of the tool 66A at the end of the movement in the X-axis direction does not become larger than X=10.0. The vibration waveform 52X is obtained as a result of correction of the amplitude at the start and at the end of the vibration waveform in the X-axis direction.

In addition, the vibration correcting unit 25 gradually increases the amplitude of the vibration waveform in the Z-axis direction generated by the waveform generating unit 24 so that the position coordinate of the tool 66A at the start of vibration in the Z-axis direction does not move to a position in the Z-axis direction smaller than Z=0.0. Thus, the vibration correcting unit 25 sets the amplitude at the position at the start of movement in the Z-axis direction to 0, and gradually increases the amplitude in the Z-axis direction. The vibration correcting unit 25 increases the amplitude until the amplitude reaches the amplitude defined in the vibration condition.

In addition, the vibration correcting unit 25 causes the amplitude of the vibration waveform in the Z-axis direction generated by the waveform generating unit 24 to converge to 0 so that the position coordinate of the tool 66A at the end of the movement in the Z-axis direction does not become larger than Z=10.0 in a manner similar to the convergence in the X-axis direction. The vibration waveform 52Z is obtained as a result of correction of the amplitude at the start and at the end of the vibration waveform in the Z-axis direction.

In the present embodiment, as illustrated in FIG. 13, the vibration correcting unit 25 corrects the amplitudes of the respective vibration waveforms so that a line connecting vibration forward positions of each vibration waveform becomes a straight line and that a line connecting vibration backward positions thereof becomes a straight line. As a result, machining of a corner portion is achieved without excessive cutting of a workpiece and further with good corner angle accuracy.

The control computation unit 2X controls the movement and the vibration of the tool 66A in accordance with the machining program 102 and the vibration waveforms 52X and 52Z. Thus, the tool 66A performs the moving vibration in accordance with the vibration waveforms 52X and 52Z illustrated in FIG. 13 to achieve the machining along the movement path illustrated in FIG. 9.

As described above, according to the second embodiment, because the numerical control device 1X starts the movement in the Z-axis direction after the movement in the X-axis direction is completed when the tolerance value is 0, the vibration waveform of the first movement path is not combined with the vibration waveform of the second movement path before and after switching of the movement path. Vibration cutting with high machining accuracy can therefore be achieved.

In addition, because the amplitudes of the vibration waveforms converge toward the end points on the respective axes, there is no need to define in the machining program that the movement in the X-axis direction is to be stopped at the point when the movement in the X-axis direction is completed, which enables a machining program to be easily created.

Third Embodiment

Next, a third embodiment of the invention will be described with reference to FIGS. 14 to 17. In the third embodiment, a method for performing tolerance control, which is different from that in the first embodiment, will be explained. In the third embodiment, when tolerance value=m, a movement path including a movement path in a third direction different from the X-axis direction and the Z-axis direction is set. In the third embodiment, a direction different from the X axis and the Z axis in an X-Z plane will be referred to as a third direction, and the third direction is a direction combining a reference vector of the X axis and a reference vector of the Z axis. In the third embodiment as well, the machining program 101 is used like in the first embodiment.

Figure 14:
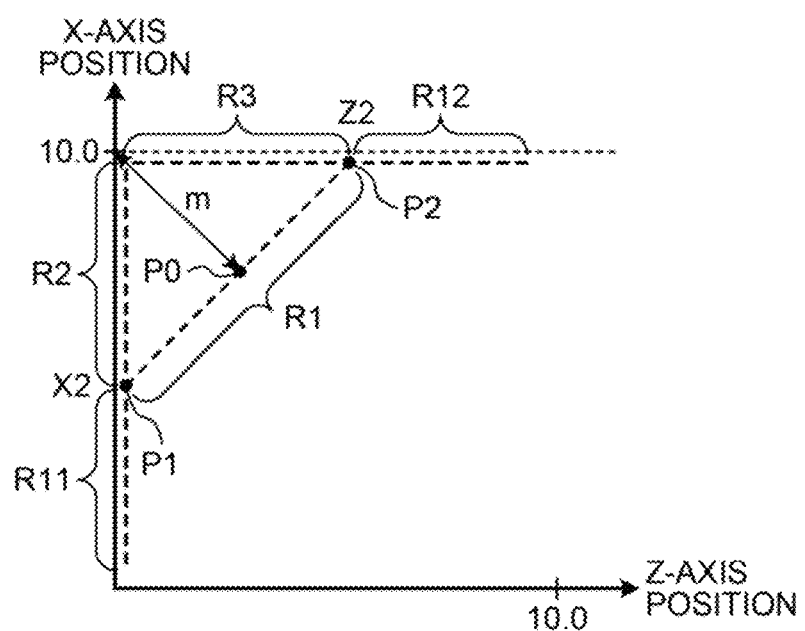
FIG. 14 is a graph illustrating a movement path generated by a numerical control device according to a third embodiment.

FIG. 14 is a graph illustrating a movement path generated by a numerical control device according to the third embodiment. In the third embodiment, the numerical control device 1X generates the movement path in FIG. 14 from the machining program in FIG. 3. The movement path herein includes movement paths R11, R1, and R12 in the X-axis direction and the Z-axis direction.

In the graph of the movement path illustrated in FIG. 14, the horizontal axis represents a position in the Z-axis direction (a Z-axis position), and the vertical axis represents a position in the X-axis direction (an X-axis position). In FIG. 14, a specific waypoint P0 set to satisfy the tolerance value is illustrated on the movement path illustrated in FIG. 4. In addition, in FIG. 14, a position on the X axis that the tool 66A passes is represented by a position P1, and a position on the Z axis that the tool 66A passes is represented by a position P2.

A path connecting the position P1 with the position P2 is the movement path R1 of the tool 66A. The positions P1 and P2 are set such that the specific waypoint P0 is located on the movement path R1 connecting the position P1 with the position P2. In FIG. 14, the X coordinate of the position P1 is represented by X2, and the Z coordinate of the position P2 is represented by Z2. The numerical control device 1X sets the movement path starting from the start point, passing the position P1, the specific waypoint P0, and the position P2 in this order, and reaching the end point. Specifically, the numerical control device 1X sets the movement path R11 from the start point to the position P1, the movement path R1 from the position P1 to the position P2, and the movement path R12 from the position P2 to the end point.

Figure 15:
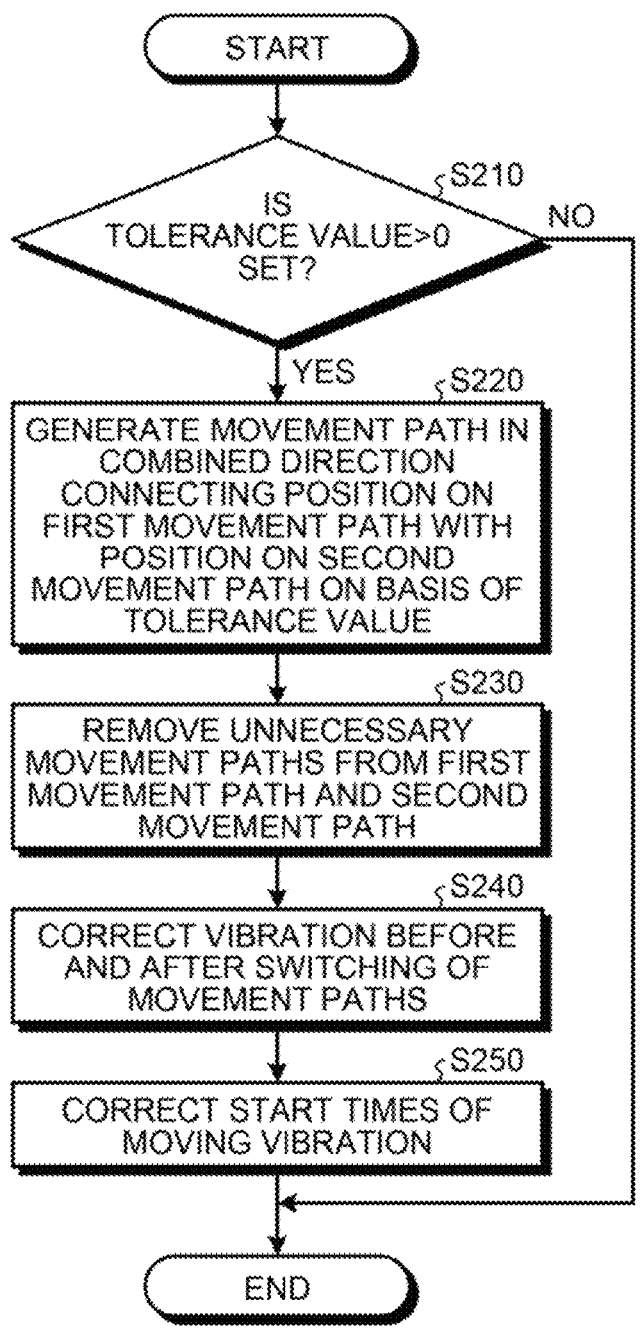
FIG. 15 is a flowchart illustrating procedures of a process of movement path setting performed by the numerical control device according to the third embodiment.

A process for setting the movement paths R11, R1, and R12 will now be explained. FIG. 15 is a flowchart illustrating procedures of a process of movement path setting performed by the numerical control device according to the third embodiment. In FIG. 15, a process of setting a movement path using a movement path in the third direction will be explained. Note that, regarding processing similar to that explained in FIG. 5 of the first embodiment or that explained in FIG. 10 of the second embodiment, redundant explanation thereof will not be repeated.

The tolerance value setting unit 23 determines whether or not a tolerance value larger than 0 is set (whether or not a specified tolerance value >0) (step S210). If no tolerance value larger than 0 is set (step S210, No), the numerical control device 1X does not perform the movement path setting process described in the third embodiment.

If a tolerance value larger than 0 is set (step S210, Yes), the tolerance value setting unit 23 sends the tolerance value to the waveform generating unit 24. The waveform generating unit 24 generates a first movement path, which is a movement path in the X-axis direction, and a second movement path, which is a movement path in the Z-axis direction. The first movement path generated by the waveform generating unit 24 is a movement path connecting X=0.0 to X=10.0. The second movement path generated by the waveform generating unit 24 is a movement path connecting Z=0.0 to Z=10.0.

The waveform generating unit 24 calculates the position P1 on the first movement path and the position P2 on the second movement path on the basis of the tolerance value. The waveform generating unit 24 generates the movement path R1 in the third direction connecting the position P1 on the first movement path with the position P2 on the second movement path (step S220). The movement path R1 in the third direction is a path connecting the position P1 with the position P2, and generated by combining a movement path in the X-axis direction and a movement path in the Z-axis direction. The waveform generating unit 24 generates the movement path R1 passing the position P1, the specific waypoint P0, and the position P2. Note that the movement path R1 may be a straight line or a curve.

Furthermore, the waveform generating unit 24 removes a movement path R2 that the tool 66A does not pass from the first movement path, and removes a movement path R3 that the tool 66A does not pass from the second movement path. Thus, the waveform generating unit 24 removes unnecessary movement paths from the first movement path and the second movement path on the basis of intersections of the movement path R1 in the third direction and the respective axes (step S230). The intersection of the movement path R1 in the third direction and the X axis is the position P1, and the intersection of the movement path R1 in the third direction and the Z axis is the position P2. The waveform generating unit 24 generates the movement path R11 by removing the movement path R2 from the first movement path, and generates the movement path R12 by removing the movement path R3 from the second movement path. The movement path R11 is a movement path connecting X=0.0 to X=X2 on the X axis, and the movement path R12 is a movement path connecting Z=Z2 to Z=10.0 on the Z axis.

The waveform generating unit 24 obtains vibration forward positions by adding the amplitude of the vibration condition to the movement paths R1, R11, and R12, and vibration backward positions by subtracting the amplitude therefrom. The waveform generating unit 24 generates the vibration waveforms of the movement paths R1, R11, and R12 on the basis of the vibration forward positions and the vibration backward positions. The vibration waveform of the movement path R11 is a vibration waveform of a movement path in the X-axis direction, and the vibration waveform of the movement path R12 is a vibration waveform of a movement path in the Z-axis direction. The vibration waveform of the movement path R1 is a vibration waveform of a movement path combining a movement path in the X-axis direction and a movement path in the Z-axis direction.

The vibration correcting unit 25 corrects the vibration waveforms of the movement paths R1, R11, and R12 on the basis of the vibration waveforms indicating the movement paths R1, R11, and R12.

Figure 16:
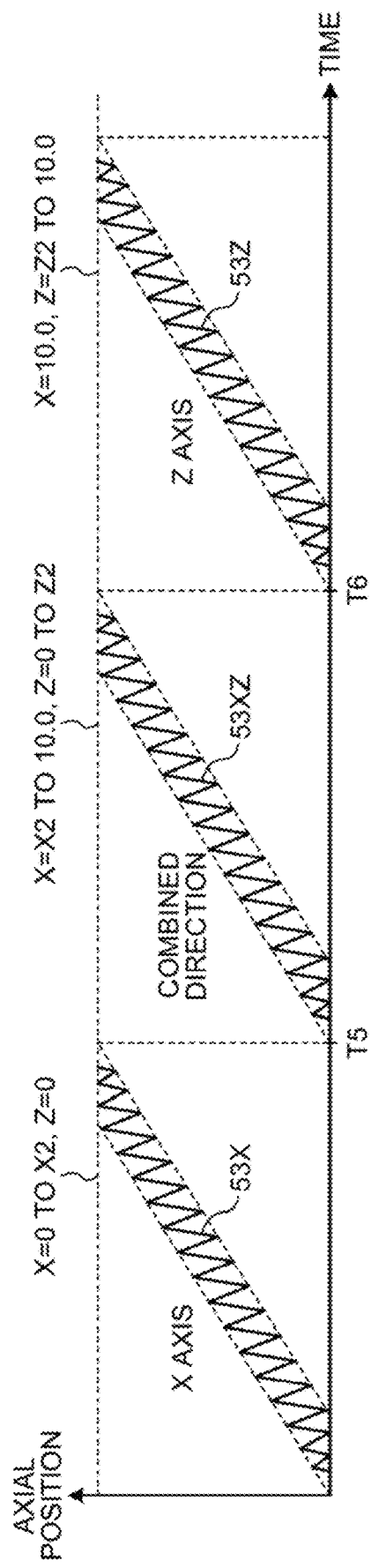
FIG. 16 is a graph for explaining vibration waveforms before the numerical control device according to the third embodiment corrects start times of moving vibration.

FIG. 16 is a graph for explaining vibration waveforms before the numerical control device according to the third embodiment corrects the start times of moving vibration. The vibration waveforms illustrated in FIG. 16 and in FIG. 17, which will be described later, include a vibration waveform in the X-axis direction, a vibration waveform in the Z-axis direction, and a vibration waveform in the third direction combining the X-axis direction and the Z-axis direction. FIG. 16 illustrates vibration waveforms in a case where vibration is corrected before and after switching of the movement paths.

The vibration correcting unit 25 corrects the vibration before and after switching of the movement paths by a process similar to that described in the first embodiment (step S240). Specifically, the vibration correcting unit 25 gradually increases the amplitude of the movement path R11 in the X-axis direction generated by the waveform generating unit 24 so that the X coordinate of the tool 66A at the start of movement in the X-axis direction does not become smaller than X=0.0.

In addition, the vibration correcting unit 25 causes the amplitude of the movement path R11 in the X-axis direction generated by the waveform generating unit 24 to converge to 0 so that the X coordinate of the tool 66A at the end of the movement in the X-axis direction does not become larger than X=X2. A vibration waveform 53X is obtained as a result of correction of the amplitude at the start and at the end of the vibration waveform in the X-axis direction.

In addition, the vibration correcting unit 25 gradually increases the amplitude of the movement path R1 in the third direction generated by the waveform generating unit 24 so that the Z coordinate of the tool 66A does not become smaller than Z=0.0 and that the X coordinate of the tool 66A does not become smaller than X=X2 at the start of movement in the third direction.

In addition, the vibration correcting unit 25 causes the amplitude of the movement path R1 in the third direction generated by the waveform generating unit 24 to converge to 0 so that the X coordinate of the tool 66A does not become larger than X=10.0 and that the Z coordinate of the tool 66A does not become larger than Z=Z2 at the end of the movement in the third direction. A vibration waveform 53XZ is obtained as a result of correction of the amplitude at the start and at the end of the vibration waveform in the third direction.

In addition, the vibration correcting unit 25 gradually increases the amplitude of the movement path R12 in the Z-axis direction generated by the waveform generating unit 24 so that the Z coordinate of the tool 66A at the start of movement in the Z-axis direction does not become smaller than Z=Z2.

In addition, the vibration correcting unit 25 causes the amplitude of the movement path R12 in the Z-axis direction generated by the waveform generating unit 24 to converge to 0 so that the Z coordinate of the tool 66A at the end of the movement in the Z-axis direction does not become larger than Z=10.0. A vibration waveform 53Z is obtained as a result of correction of the amplitude at the start and at the end of the vibration waveform in the Z-axis direction.

In FIG. 16, the time when machining in accordance with the vibration waveform 53X is to be completed and machining in accordance with the vibration waveform 53XZ is to be started is represented by time T5, and the time when machining in accordance with the vibration waveform 53XZ is to be completed and machining in accordance with the vibration waveform 53Z is to be started is represented by time T6.

Figure 17:
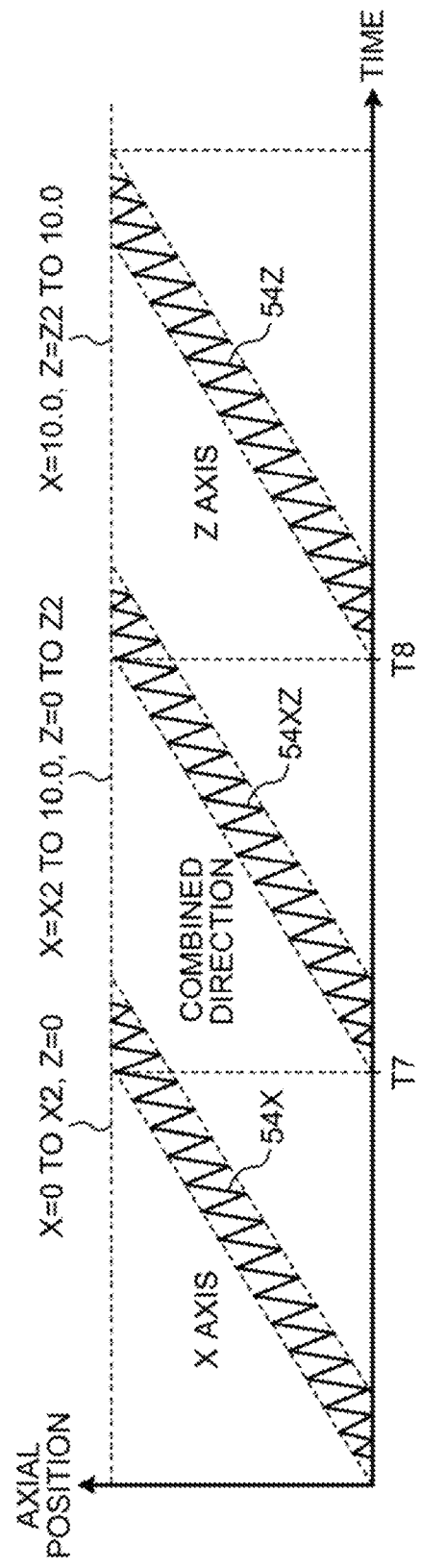
FIG. 17 is a graph for explaining vibration waveforms after the numerical control device according to the third embodiment corrected the start times of moving vibration.

The vibration correcting unit 25 corrects time T5 and time T6, which are start times of moving vibration (step S250). FIG. 17 is a graph for explaining vibration waveforms after the numerical control device according to the third embodiment corrected the start times of moving vibration.

FIG. 17 illustrates a vibration waveform 54X in the X-axis direction, a vibration waveform 54XZ obtained by correcting the start time of the moving vibration in the third direction, and a vibration waveform 54Z obtained by correcting the start time of the moving vibration in the Z-axis direction. In the third embodiment, the vibration waveform 54X corresponds to the first vibration waveform, the vibration waveform 54Z corresponds to the second vibration waveform, and the vibration waveform 54XZ corresponds to a third vibration waveform.

The vibration waveform 54X is a vibration waveform similar to the vibration waveform 53X illustrated in FIG. 16. The vibration waveform 54XZ is a vibration waveform obtained by correcting the start time of the vibration waveform 53XZ illustrated in FIG. 16, and the vibration waveform 54Z is a vibration waveform obtained by correcting the start time of the vibration waveform 53Z illustrated in FIG. 16.

The vibration correcting unit 25 adjusts the start time of the vibration waveform 54XZ so that the vibration waveform 54XZ passes the specific waypoint P0 and that machining in the third direction is started at time T7 when the vibration waveform 54XZ first reaches the position of X=X2. Specifically, the vibration correcting unit 25 changes the start time of the vibration waveform 54XZ to time T7. In this manner, the vibration correcting unit 25 brings forward the start time of the vibration waveform 54XZ so that the timing when the vibration waveform 54X reaches the position of X=X2 and the timing when the vibration waveform 54XZ is started are coincident with each other. As a result, switching of the moving direction can be made without stopping the vibration of the tool 66A, which enables a smooth vibration waveform to be achieved.

In addition, the vibration correcting unit 25 adjusts the start time of the vibration waveform 54Z so that machining in accordance with the vibration waveform 54Z is started at time T8 when the vibration waveform 54XZ first reaches the position of Z=Z2, X=10.0. Note that the time when a vibration waveform first reaches a predetermined position refers to the time when a line connecting maximum points of the vibration waveform reaches the predetermined position. Thus, the vibration correcting unit 25 changes the start time of the vibration waveform 54Z to time T8. In this manner, the vibration correcting unit 25 brings forward the start time of the vibration waveform 54Z so that the timing when the vibration waveform 54XZ first reaches the position of Z=Z2, X=10.0 and the timing when the vibration waveform 54Z is started are coincident with each other. As a result, switching of the moving direction can be made without stopping the vibration of the tool 66A, which enables a smooth vibration waveform to be achieved.

The control computation unit 2X controls the movement and the vibration of the tool 66A in accordance with the machining program 101 and the vibration waveforms 54X, 54XZ, and 54Z. Thus, the tool 66A performs the moving vibration in accordance with the vibration waveforms 54X, 54XZ, and 54Z illustrated in FIG. 17 to achieve the machining along the movement path illustrated in FIG. 14.

Note that the timing when the vibration waveform 54XZ is started may be any timing from the timing when the vibration waveform 54X first reaches X=X2 until the amplitude of the vibration waveform 54X becomes 0. In addition, the timing when the vibration waveform 54Z is started may be any timing from the timing when the vibration waveform 54XZ first reaches Z=Z2 until the amplitude of the vibration waveform 54XZ becomes 0.

As described above, according to the third embodiment, in a manner similar to the first embodiment, when the tolerance value is larger than 0, the numerical control device 1X generates a movement path along which the tool 66A passes the specific waypoint P0 associated with the tolerance value on the basis of the tolerance value. Thus, a movement path associated with the tolerance value can be set.

Fourth Embodiment

Next, a fourth embodiment of the invention will be described with reference to FIGS. 18 to 21. While the process of correcting the vibration is performed before and after switching of the movement paths in the first to third embodiments, the process of correcting the vibration before and after switching of the movement paths is not performed when the edge of the tool 66A does not interfere with (come in contact with) the workpiece 70 in the fourth embodiment.

In a case where the process of the fourth embodiment is applied to any of the first to third embodiments, a similar process will be performed in any case. Therefore, a case where the process of correcting the vibration before and after switching of the movement paths is not performed during the movement path setting process described in the first embodiment will be described in the fourth embodiment.

Figure 18:
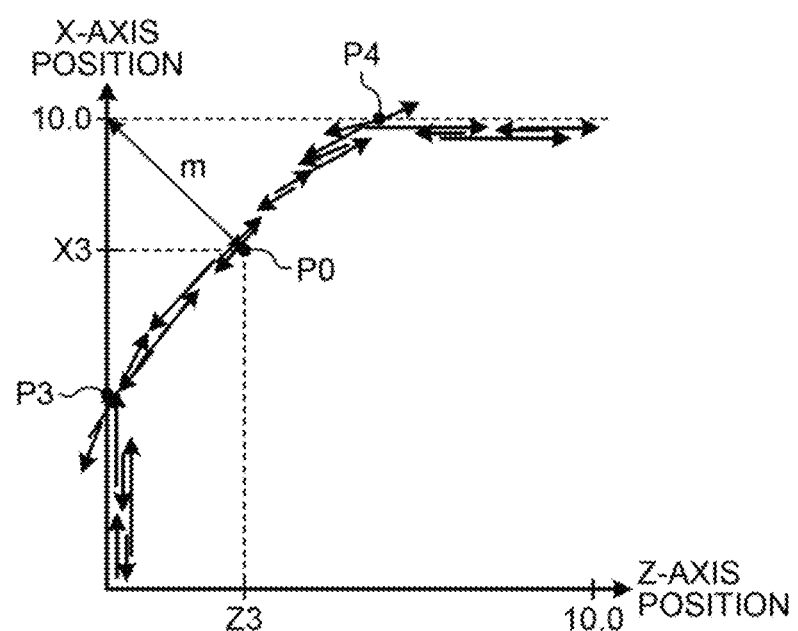
FIG. 18 is a graph illustrating a movement path generated by a numerical control device according to a fourth embodiment.

FIG. 18 is a graph illustrating a movement path generated by a numerical control device according to the fourth embodiment. In the fourth embodiment, the numerical control device 1X generates the movement path in FIG. 18 from the machining program in FIG. 3. The movement path herein includes a movement path in the X-axis direction and a movement path in the Z-axis direction.

In the graph of the movement path illustrated in FIG. 18, the horizontal axis represents a position in the Z-axis direction (a Z-axis position), and the vertical axis represents a position in the X-axis direction (an X-axis position). In FIG. 18, a specific waypoint P0 set to satisfy the tolerance value is illustrated on the movement path illustrated in FIG. 4. In FIG. 18, the X coordinate of the specific waypoint P0 is represented by X3, and the Z coordinate thereof is represented by Z3. In addition, in FIG. 18, a position on the X axis that the tool 66A passes is represented by a position P3, and a position on the Z axis that the tool 66A passes is represented by a position P4.

A path connecting the position P3 with the position P4 is a movement path of the tool 66A. The positions P3 and P4 are set such that the specific waypoint P0 is located on the movement path connecting the position P3 with the position P4. The numerical control device 1X sets the movement path starting from the start point, passing the position P3, the specific waypoint P0, and the position P4 in this order, and reaching the end point.

Figure 19:
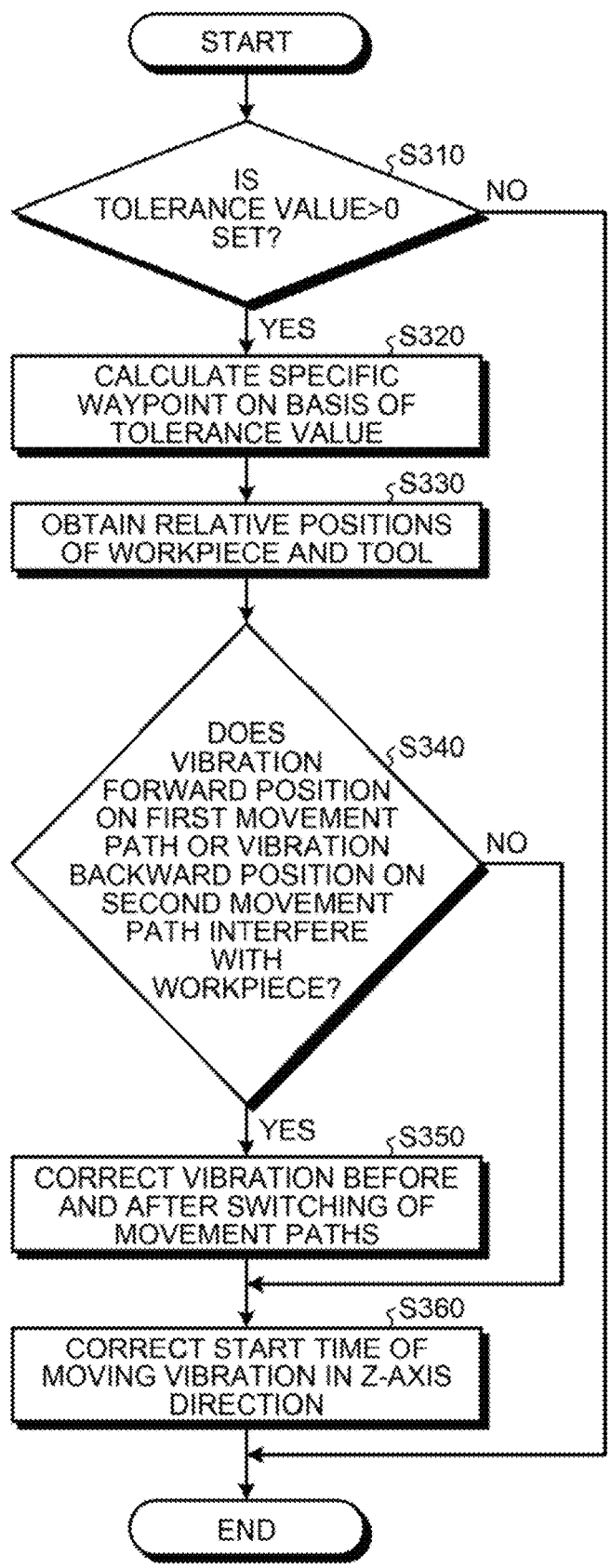
FIG. 19 is a flowchart illustrating procedures of a process of movement path setting performed by the numerical control device according to the fourth embodiment.

FIG. 19 is a flowchart illustrating procedures of a process of movement path setting performed by the numerical control device according to the fourth embodiment. The processes in steps S310 and S320 are similar to the processes in steps S10 and S20 explained in FIG. 5 of the first embodiment, and the explanation thereof will therefore not be repeated.

The waveform generating unit 24 generates vibration waveforms by processes similar to the processes described in the first embodiment. Specifically, the waveform generating unit 24 generates a vibration waveform corresponding to the movement path in the X-axis direction by combining the command movement amount and the vibration movement amount in the X-axis direction. The waveform generating unit 24 also generates a vibration waveform corresponding to the movement path in the Z-axis direction by combining the command movement amount and the vibration movement amount in the Z-axis direction.

The vibration correcting unit 25 obtains relative positions of the workpiece 70 and the tool 66A (step S330). Specifically, the vibration correcting unit 25 obtains information on whether the workpiece 70 is on the inner side or on the outer side of a corner that the movement path of the tool 66A forms on the basis of a command on a nose R obtained by analysis performed by the analysis processing unit 37. Note that the inner side of the corner refers to a side at an angle smaller than 180°, and the outer side of the corner refers to a side at an angle larger than 180°.

As illustrated in FIG. 11, when the angle of a corner shape of the workpiece 70 is smaller than 180°, that is, when the workpiece 70 is on the inner side of a corner formed by the movement path, the tool 66A and the workpiece 70 do not interfere with each other without correction of the movement path of the tool 66A at switching of the moving direction. In this case, the vibration correcting unit 25 determines that the tool 66A may move outside of the right angle position. In other words, in a case where the workpiece 70 is present on the inner side of the corner of the movement path illustrated in FIG. 18, the movement of the tool 66A beyond the range from the start position coordinates to the end position coordinates does not affect the shape of the machined workpiece 70. Thus, the vibration correcting unit 25 determines that the tool 66A and the workpiece 70 do not interfere with each other without correction of the movement path of the tool 66A at switching of the moving direction.

In contrast, when the workpiece 70 is on the outer side of a corner of the movement path of the tool 66A as illustrated in FIG. 12, the tool 66A and the workpiece 70 interfere with each other unless the movement path of the tool 66A is corrected at switching of the moving direction. In this case, the vibration correcting unit 25 determines that the tool 66A should not move outside of the right angle position.

Figure 20:
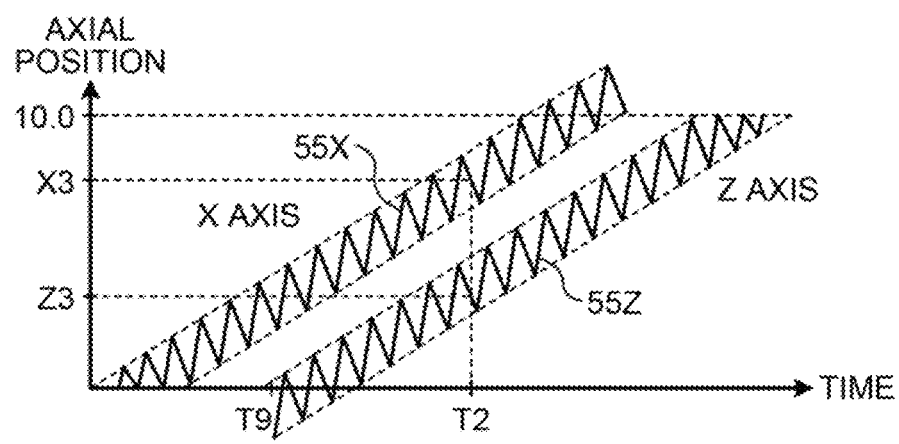
FIG. 20 is a graph for explaining vibration waveforms generated by the numerical control device according to the fourth embodiment.

FIG. 20 is a graph for explaining vibration waveforms generated by the numerical control device according to the fourth embodiment. Herein, the vibration waveforms include a vibration waveform in the X-axis direction and a vibration waveform in the Z-axis direction. FIG. 20 illustrates a vibration waveform 55X corresponding to the movement path in the X-axis direction and a vibration waveform 55Z corresponding to the movement path in the Z-axis direction. In FIG. 20, the horizontal axis represents time, the vertical axis of the vibration waveform 55X represents the position (axial position) in the X-axis direction, and the vertical axis of the vibration waveform 55Z represents the position (axial position) in the Z-axis direction.

The movement paths generated by the waveform generating unit 24 are a movement path in the X-axis direction and a movement path in the Z-axis direction. The waveform generating unit 24 generates the movement paths for starting machining in the Z-axis direction at a timing when machining in the X-axis direction is completed.

The vibration correcting unit 25 determines whether or not a vibration forward position on the first movement path or a vibration backward position on the second movement path interferes with the workpiece 70 on the basis of relative positions of the workpiece 70 and the tool 66A (step S340). Thus, the vibration correcting unit 25 determines whether or not a position indicated by the vibration waveform interferes with the workpiece 70 when the position indicated by the vibration waveform reaches a target position.

If the vibration forward position on the first movement path or the vibration backward position on the second movement path interferes with the workpiece 70 (step S340, Yes), the vibration correcting unit 25 corrects the vibration before and after switching of the movement paths in a manner similar to the first embodiment (step S350). Specifically, if the vibration forward position on the first movement path interferes with the workpiece 70, the vibration correcting unit 25 corrects the amplitude at the start and at the end of the vibration waveform in the X-axis direction so that the vibration forward position does not interfere with the workpiece 70. If the vibration backward position on the second movement path interferes with the workpiece 70, the vibration correcting unit 25 corrects the amplitude at the start and at the end of the vibration waveform in the Z-axis direction so that the vibration backward position does not interfere with the workpiece 70.

If the vibration forward position on the first movement path and the vibration backward position on the second movement path do not interfere with the workpiece 70 (step S340, No), the vibration correcting unit 25 does not correct the vibration before and after switching of the movement paths.

Specifically, if the tool 66A does not interfere with the workpiece 70 at the end of the moving vibration on the first movement path, the vibration correcting unit 25 does not perform the correction of causing the amplitude of vibration waveform in the X-axis direction to converge at the end of the moving vibration on the first movement path. In addition, if the tool 66A does not interfere with the workpiece 70 at the start of the moving vibration on the second movement path, the vibration correcting unit 25 does not perform the correction of gradually increasing the amplitude of the vibration waveform in the Z-axis direction at the start of the second movement path.

If the result in step S340 is No or after the process in step S350, the vibration correcting unit 25 adjusts the timing (time T9) at which the vibration waveform 55Z is to be started so that the tool 66A passes the specific waypoint P0 in a manner similar to the first embodiment. In other words, the vibration correcting unit 25 corrects the start time of moving vibration in the Z-axis direction (step S360).

The control computation unit 2X controls the movement and the vibration of the tool 66A in accordance with the machining program 101 and the vibration waveforms 55X and 55Z. Thus, the tool 66A performs the moving vibration in accordance with the vibration waveforms 55X and 55Z illustrated in FIG. 20 to achieve the machining along the movement path illustrated in FIG. 18.

As described above, when the tool 66A does not interfere with the workpiece 70, there is no disadvantage in the movement of the tool 66A beyond the positions P3 and P4. When the tool 66A does not interfere with the workpiece 70, the amplitude of the vibration waveform is not corrected, which enables continuous vibration of the tool 66A, and thus can shorten the machining time.

Note that the tolerance value may be specified by the user (operator). In this case, the user stores the tolerance value in a machining program or a ladder program to specify the tolerance value. In addition, the tolerance value specified by the user is not limited to a tolerance value specified directly, but a plurality of levels of tolerance values may be specified. The tolerance values set in a plurality of levels are stored as tolerance level information in the storage unit 34 of the numerical control device 1X.

Figure 21:
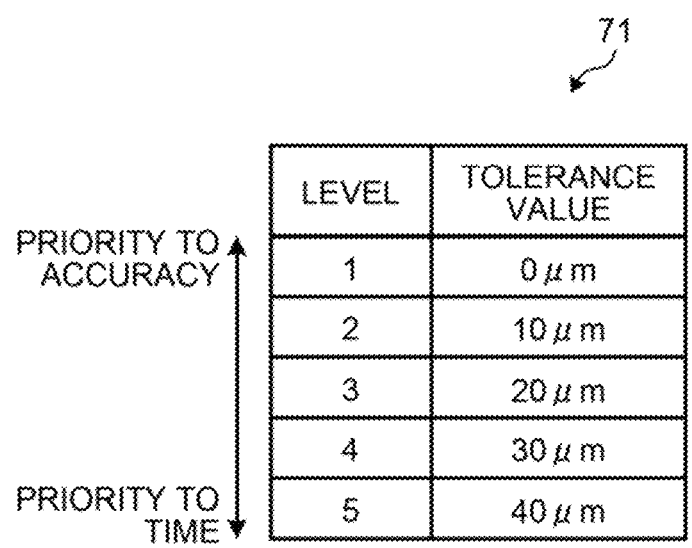
FIG. 21 is a table for explaining tolerance level information used by the numerical control device according to the fourth embodiment.

FIG. 21 is a table for explaining the tolerance level information used by the numerical control device according to the fourth embodiment. Tolerance level information 71 is information on tolerance values set in a plurality of levels depending on the machining accuracy. In the tolerance level information 71, a tolerance value and a level of the machining accuracy (machining time) are associated with each other. For example, in the tolerance level information 71, a first level corresponds to a tolerance value of 0 µm, and a second level corresponds to a tolerance value of 10 µm. In addition, in the tolerance level information 71, a fourth level corresponds to a tolerance value of 30 µm, and a fifth level corresponds to a tolerance value of 40 µm.

In the tolerance level information 71, higher priority is placed on the machining accuracy as the level is lower, and higher priority is placed on the machining time as the level is higher. Thus, the machining accuracy is highest when machining is performed with the tolerance value of the first level, and the machining time is the shortest when machining is performed with the tolerance value of the fifth level. The tolerance value setting unit 23 of the numerical control device 1X sets the tolerance value on the basis of the level specified by the user and the tolerance level information 71.

Alternatively, identification information of tolerance values may be used instead of the levels in the tolerance level information 71. Specifically, the tolerance level information 71 may be information in which a tolerance value and identification information are associated with each other.

In addition, the tolerance level information 71 can be customized by operation performed by the user. In addition, the level in the tolerance level information 71 may be specified by a machining program, or the like. In this case, the tolerance value setting unit 23 of the numerical control device 1X sets the tolerance value on the basis of the level specified in the machining program or the like and the tolerance level information 71. The tolerance value setting unit 23 may also set the tolerance value on the basis of the tolerance level information 71 in the first to third embodiments.

As described above, according to the fourth embodiment, because the numerical control device 1X does not correct the vibration before and after switching of the movement paths when the edge of the tool 66A does not interfere with the workpiece 70, machining of a corner can be performed with the amplitude of the vibration waveform unchanged. As a result, no delay in the machining time due to an increase or a decrease in the amplitude of a vibration waveform occurs, which prevents the machining time from being lengthened.

Fifth Embodiment

Next, a fifth embodiment of the invention will be described with reference to FIG. 22. In the fifth embodiment, tolerance values for machining on desired movement paths are learned by machine learning.

Figure 22:
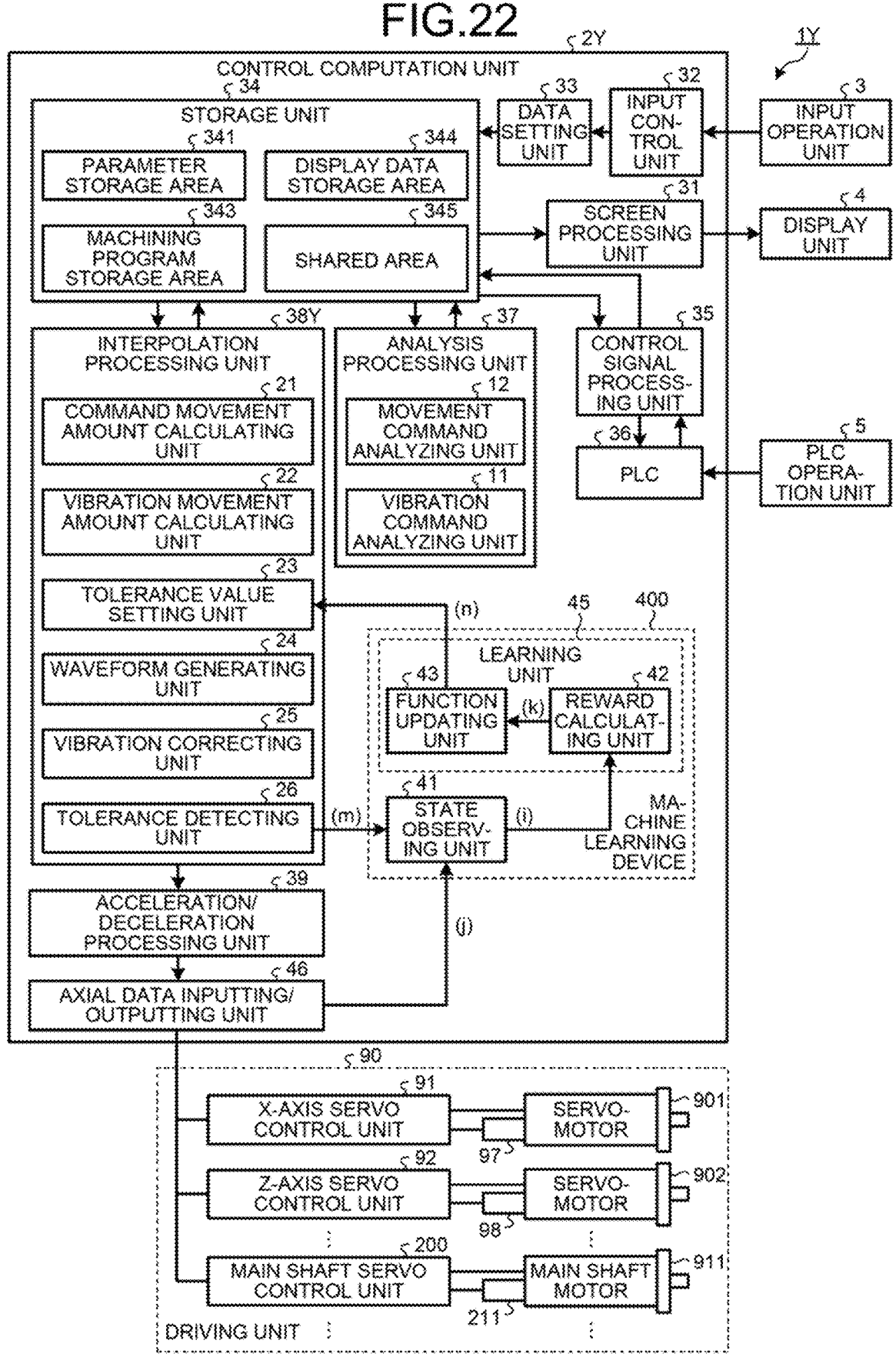
FIG. 22 is a diagram illustrating an example of a configuration of a numerical control device according to a fifth embodiment.

FIG. 22 is a diagram illustrating an example of a configuration of a numerical control device according to the fifth embodiment. A numerical control device 1Y performs control of low frequency vibration cutting on the machine tool 110 in a manner similar to the numerical control device 1X described in the first to fourth embodiments. The numerical control device 1Y includes a machine learning device 400, and the machine learning device 400 learns tolerance values used for tolerance control and determines actions in the tolerance control in order to improve the accuracy of the tolerance control.

As compared with the numerical control device 1X, the numerical control device 1Y includes a control computation unit 2Y instead of the control computation unit 2X. As compared with the control computation unit 2X, the control computation unit 2Y includes an interpolation processing unit 38Y instead of the interpolation processing unit 38X, and an axial data inputting/outputting unit 46 instead of the axial data outputting unit 40. The control computation unit 2Y also includes the machine learning device 400.

The interpolation processing unit 38Y includes a tolerance detecting unit 26 in addition to the components of the interpolation processing unit 38X. The tolerance detecting unit 26 obtains a tolerance value (m) determined by the tolerance value setting unit 23, and sends the tolerance value to the machine learning device 400.

The axial data inputting/outputting unit 46 includes functions of receiving feedback (FB) positions (j) sent from the X-axis servo control unit 91 and the Z-axis servo control unit 92 and inputting the FB positions (j) to the machine learning device 400, in addition to the functions of the axial data outputting unit 40 described in the first embodiment. The FB positions (j) are a position (coordinates) of an actual specific waypoint in a case where tolerance control is performed using the tolerance value (m). The axial data inputting/outputting unit 46 receives a position in the X-axis direction from the X-axis servo control unit 91, and receives a position in the Z-axis direction from the Z-axis servo control unit 92 among the FB positions (j).

The machine learning device 400 includes a learning unit 45, and a state observing unit 41. The state observing unit 41 observes the FB positions (j) and the tolerance value (m) as state variables (i). The learning unit 45 learns an action (n), that is, a tolerance value (m) to be determined next in accordance with a training data set created on the basis of the state variables (i) of the FB positions (j) and the tolerance value (m).

Any learning algorithm may be used by the learning unit 45. For example, a case where reinforcement learning is applied will be described. In reinforcement learning, an agent (a subject of actions) in an environment observes a current state, and determines an action (n) to be taken. The agent receives a reward from the environment by selecting an action (n), and learns measures to receive the most rewards through a series of actions. Q-learning and TD-learning are known as typical techniques of the reinforcement learning. For example, in a case of Q-learning, a typical updating formula (action value table) of an action value function Q(s, a) is expressed by formula (1).

[Mathematical Formula 1]

$$Q(s_t, a_t) \leftarrow Q(s_t, a_t) + \alpha\left(r_{t+1} + \gamma \max_a Q(s_{t+1}, a) - Q(s_t, a_t)\right) \quad (1)$$

In formula (1), $s_t$ represents an environment at time t, and $a_t$ represents an action at time t. The action $a_t$ changes the environment to $s_{t+1}$. $r_{t+1}$ represents a reward given as a result of the change in the environment, γ represents a discount rate, and α represents a learning coefficient. In the case where Q-learning is applied, the next tolerance value corresponds to the action $a_t$.

The updating formula expressed by formula (1) increases an action value Q when the action value of a best action a at time t+1 is larger than action value Q of an action a performed at time t, or decreases the action value Q in an opposite case. In other words, the action value function Q(s, a) is updated so that the action value Q of the action a at time t becomes closer to a best action value at time t+1. As a result, a best action value in an environment sequentially propagates to action values of previous environments.

The learning unit 45 includes a reward calculating unit 42, and a function updating unit 43. The reward calculating unit 42 calculates a reward (k) on the basis of the tolerance value (m) and the FB positions (j), which are state variables (i). When the difference between the position of a specific waypoint P0 associated with the tolerance value (m) and the FB positions (j), which are the actual specific waypoint P0, is small, for example, the reward calculating unit 42 increases the reward (k) (gives a reward of "1", for example). In contrast, when the difference between the tolerance value (m) and the FB positions (j) is large, the reward calculating unit 42 decreases the reward (k) (gives a reward of "−1", for example). The reward calculating unit 42 may give a larger reward as the difference between the tolerance value (m) and the FB positions (j) is smaller, and a smaller reward as the difference is larger. The tolerance value (m) and the FB positions (j) are extracted by a known method. When the difference between the tolerance value (m) and the FB positions (j) is "0", the largest reward is given.

The function updating unit 43 updates a function for determining an action (n) (a next tolerance value) according to the reward calculated by the reward calculating unit 42. In the case of Q-learning, for example, the function updating unit 43 uses the action value function $Q(s_t, a_t)$ expressed by formula (1) as a function for determining a next tolerance value (m). For example, the learning unit 45 determines a next tolerance value (m) with which the difference between the tolerance value (m) and the FB positions (j) is "0", which results in a largest reward.

In view of the above, only the next tolerance value (m) is determined and the determination condition is changed to determine the next tolerance value (m) that results in a largest reward, but the other control methods may be the same as those in the first to fourth embodiments.

Note that the machine learning device 400 may be provided outside the control computation unit 2Y. In addition, while the case of machine learning using the reinforcement learning is described in the fifth embodiment, machine learning may be performed in accordance with other known methods, such as a neural network, genetic programming, inductive logic programming, and a support vector machine.

As described above, according to the fifth embodiment, the machine learning device 400 learns suitable tolerance values (m) on the basis of a current tolerance value (m) and FB positions (j), and the machining accuracy during tolerance machining of low frequency vibration cutting can be improved.

Figure 23:
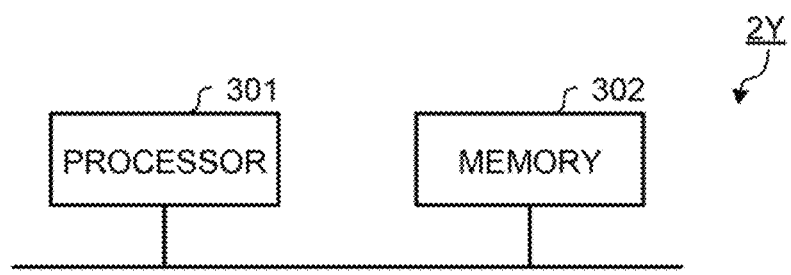
FIG. 23 is a diagram illustrating an example of a hardware configuration of the control computation units according to the first to fifth embodiments.

A hardware configuration of the control computation units 2X and 2Y of the numerical control devices 1X and 1Y will now be described. FIG. 23 is a diagram illustrating an example of a hardware configuration of the control computation units according to the first to fifth embodiments. Note that, because the control computation units 2X and 2Y have hardware configurations similar to each other, the hardware configuration of the control computation unit 2Y will be described herein.

The control computation unit 2Y can be implemented by a processor 301 and a memory 302 illustrated in FIG. 23. Examples of the processor 301 include a central processing unit (CPU; also referred to as a central processing device, a processing device, a computing device, a microprocessor, a microcomputer, a processor, or a digital signal processor (DSP)) or a system large scale integration (LSI). Examples of the memory 302 include a random access memory (RAM) or a read only memory (ROM).

The control computation unit 2Y is implemented by the processor 301 reading and executing programs for performing operations of the control computation unit 2Y stored in the memory 302. In other words, the programs cause a computer to execute the procedures or methods of the control computation unit 2Y. The memory 302 is also used as a temporary memory when the processor 301 executes various processes.

The programs to be executed by the processor 301 may be a computer program product including a computer-readable and non-transitory recording medium containing a plurality of computer-executable instructions for performing data processing. The programs to be executed by the processor 301 include a plurality of instructions that cause a computer to perform data processing.

Alternatively, the control computation unit 2Y may be implemented by dedicated hardware. Alternatively, some of the functions of the control computation unit 2Y may be implemented by dedicated hardware, and others may be implemented by software or firmware.

The configurations presented in the embodiments above are examples of the present invention, and can be combined with other known technologies or can be partly omitted or modified without departing from the scope of the present invention.

REFERENCE SIGNS LIST 1X, 1Y numerical control device; 2X, 2Y control computation unit; 3 input operation unit; 4 display unit; vibration command analyzing unit; 12 movement command analyzing unit; 21 command movement amount calculating unit; 22 vibration movement amount calculating unit; 23 tolerance value setting unit; 24 waveform generating unit; vibration correcting unit; 26 tolerance detecting unit; 34 storage unit; 36 PLC; 37 analysis processing unit; 38X, 38Y interpolation processing unit; 39 acceleration/deceleration processing unit; 40 axial data outputting unit; 41 state observing unit; 42 reward calculating unit; 43 function updating unit; 45 learning unit; 46 axial data inputting/outputting unit; 51X, 51Z, 52X, 52Z, 53X, 53XZ, 53Z, 54X, 54XZ, 54Z, 55X, 55Z vibration waveform; 60 main shaft; 61X, 61Z drive shaft; 65A tool rest; 66A tool; 70 workpiece; 71 tolerance level information; 90 driving unit; 91 X-axis servo control unit; 92 Z-axis servo control unit; 101, 102 machining program; 110 machine tool; 341 parameter storage area; 343 machining program storage area; 344 display data storage area; 345 shared area; 400 machine learning device; P0 specific waypoint; P1 TO P4 position; R1 TO R3, R11, R12 movement path.

The invention claimed is:

1. A numerical control device for controlling a main shaft and a drive shaft, the main shaft being a rotating shaft for an object, the drive shaft driving a tool for vibration cutting of the object, the numerical control device comprising:
a memory to store a machining program for vibration cutting of the object; and
a control processor to calculate a specific point that the tool passes during the vibration cutting on a basis of a tolerance value being an allowable error in machining of a corner of the object from a first direction to a second direction, and generate a vibration waveform of the tool indicating a movement path of the tool passing the specific point, wherein
the control processor generates, as the vibration waveform, a first vibration waveform in the first direction and a second vibration waveform in the second direction, corrects, on a basis of the tolerance value set by the calculation of the specific point, a start timing of the second vibration waveform so that the first vibration waveform and the second vibration waveform pass the specific point at a same timing when the tolerance value is larger than 0, and controls movement and vibration of the tool in accordance with the machining program and the vibration waveform, and
when the first vibration waveform passes the specific point a plurality of times, the timing when the first vibration waveform and the second vibration waveform pass the specific point is set from among timings when the first vibration waveform passes the specific point a plurality of times, and a start timing of the second vibration waveform is corrected on a basis of the tolerance value so that the second vibration waveform passes the specific point at the set timing.

2. The numerical control device according to claim 1, wherein
when the tolerance value is 0, the control processor sets a start timing of the second vibration waveform to a timing after completion of driving in the first direction in accordance with the first vibration waveform.

3. The numerical control device according to claim 2, wherein
when the movement path during the machining of the corner is a path with a predetermined angle or smaller, the control processor sets the tolerance value to 0.

4. The numerical control device according to claim 1, wherein
the control processor generates the vibration waveform to further include a third vibration waveform in a third direction.

5. The numerical control device according to claim 4, wherein
when the tolerance value is larger than 0, the control processor corrects a start timing of the third vibration waveform so that the vibration waveform passes the specific point.

6. The numerical control device according to claim 4, wherein
the control processor corrects start timings of the third vibration waveform and the second vibration waveform so that the third vibration waveform starts before the first vibration waveform ends and that the second vibration waveform starts before the third vibration waveform ends.

7. The numerical control device according to claim 1, wherein
the control processor
corrects an amplitude of the vibration waveform so that the vibration waveform does not vibrate beyond a target position when a position indicated by the vibration waveform reaches the target position, and
corrects the amplitude of the vibration waveform so that the vibration waveform does not vibrate beyond a start position of the vibration waveform when the vibration waveform starts.

8. The numerical control device according to claim 1, wherein
the control processor
determines whether or not a position indicated by the vibration waveform interferes with the object when the position indicated by the vibration waveform reaches a target position, and does not correct, in a case where the position does not interfere with the object, the vibration waveform when reaching the target position.

9. The numerical control device according to claim 1, wherein
the memory stores level information including tolerance values set in a plurality of levels depending on machining accuracy, and
the control processor sets the tolerance value on a basis of a level of the machining accuracy specified by a user and the level information.

10. A numerical control method for controlling a main shaft and a drive shaft, the main shaft being a rotating shaft for an object, the drive shaft driving a tool for vibration cutting of the object, the numerical control method comprising:
storing a machining program for vibration cutting of the object;
calculating a specific point that the tool passes during the vibration cutting on a basis of a tolerance value being an allowable error in machining of a corner of the object from a first direction to a second direction;
generating a vibration waveform of the tool indicating a movement path of the tool passing the specific point; and
controlling movement and vibration of the tool in accordance with the machining program and the vibration waveform, wherein
the generating includes generating, as the vibration waveform, a first vibration waveform in the first direction and a second vibration waveform in the second direction, and correcting, on a basis of the tolerance value set by the calculation of the specific point, a start timing of the second vibration waveform so that the first vibration waveform and the second vibration waveform pass the specific point at a same timing when the tolerance value is larger than 0, and
when the first vibration waveform passes the specific point a plurality of times, the timing when the first vibration waveform and the second vibration waveform pass the specific point is set from among timings when the first vibration waveform passes the specific point a plurality of times, and a start timing of the second vibration waveform is corrected on a basis of the tolerance value so that the second vibration waveform passes the specific point at the set timing.

11. The numerical control device according to claim 1, further comprising: a machine learning device to learn the tolerance value in controlling the drive shaft, wherein
the machine learning device includes a processor configured as:
a state observer to observe, as state variables, the tolerance value and a position of the specific point that the tool passes when control is performed using the tolerance value; and
a learner to learn a tolerance value for a difference between a specific point associated with the tolerance value and an actual specific point in accordance with a data set created on a basis of the state variables.

12. The numerical control device according to claim 1, wherein
the control processor corrects the vibration waveform so that an intermediate position between a vibration forward position obtained by adding an amplitude of vibration to the movement path and a vibration backward position obtained by subtracting the amplitude of vibration from the movement path passes the specific point.

13. The numerical control device according to claim 1, wherein
the tolerance value is expressed by a shortest distance between a position at which a machining direction at a corner machining part of the object changes from the first direction to the second direction and the movement path.

14. The numerical control device according to claim 1, wherein
the tolerance value is specified in the machining program or a ladder program describing a machine operation of a programmable logic controller.

* * * * *